(12) United States Patent
Petrushin

(10) Patent No.: US 6,353,810 B1
(45) Date of Patent: Mar. 5, 2002

(54) SYSTEM, METHOD AND ARTICLE OF MANUFACTURE FOR AN EMOTION DETECTION SYSTEM IMPROVING EMOTION RECOGNITION

(75) Inventor: Valery A. Petrushin, Arlington Heights, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/387,037

(22) Filed: Aug. 31, 1999

(51) Int. Cl.⁷ .............................................. G10L 11/00
(52) U.S. Cl. ....................... 704/236; 704/246; 704/270
(58) Field of Search ................................. 704/270, 274, 704/275, 231, 246, 251, 206, 207, 236

(56) References Cited

U.S. PATENT DOCUMENTS

| | | | |
|---|---|---|---|
| 3,971,034 A | 7/1976 | Bell, Jr. et al. .................. 346/1 |
| 4,093,821 A | 6/1978 | Williamson ............. 179/1 MN |
| 4,142,067 A | 2/1979 | Williamson ............... 179/1 SC |
| 4,490,840 A | 12/1984 | Jones .......................... 381/48 |
| 4,592,086 A | 5/1986 | Watari et al. .................. 381/43 |
| 4,602,129 A | 7/1986 | Matthews et al. ............ 179/18 |
| 4,696,038 A | 9/1987 | Doddington et al. ......... 381/38 |
| 4,996,704 A | 2/1991 | Brunson ...................... 379/67 |
| 5,163,083 A | 11/1992 | Dowden et al. ............... 379/88 |
| 5,495,553 A | 2/1996 | Jakatdar ..................... 395/2.6 |
| 5,539,861 A | 7/1996 | DeSimone ................. 395/2.43 |
| 5,774,859 A | 6/1998 | Houser et al. .............. 704/275 |
| 5,812,977 A | 9/1998 | Douglas ..................... 704/275 |
| 5,884,247 A | 3/1999 | Christy .......................... 704/7 |
| 5,893,057 A | 4/1999 | Fujimoto et al. ........... 704/246 |
| 5,903,870 A | 5/1999 | Kaufman .................... 704/275 |
| 5,909,665 A | 6/1999 | Kato .......................... 704/241 |
| 5,913,196 A | 6/1999 | Talmor et al. .............. 704/270 |
| 5,936,515 A | 8/1999 | Right et al. .............. 340/384.5 |
| 6,151,571 A | * 11/2000 | Pertrushin ................... 704/209 |
| 6,159,015 A | * 12/2000 | Buffngton et al. .......... 434/236 |

* cited by examiner

*Primary Examiner*—David D. Knepper
(74) *Attorney, Agent, or Firm*—Brinks Hofer Gilson & Lione

(57) ABSTRACT

A voice signal and an emotion associated therewith is provided. Then, the emotion associated with the voice signal is determined in an automated manner and subsequently stored. Next, a user determined emotion associated with the voice signal is determined by a user and received. The automatically determined emotion with the user determined emotion are then compared.

18 Claims, 17 Drawing Sheets

SYSTEM, METHOD AND ARTICLE OF MANUFACTURE FOR AN EMOTION DETECTION SYSTEM IMPROVING EMOTION RECOGNITION

FIELD OF THE INVENTION

The present invention relates to voice recognition and more particularly improving emotion recognition via a gamelike computer-implemented system.

BACKGROUND OF THE INVENTION

Although the first monograph on expression of emotions in animals & humans was written by Charles Darwin in the last century and psychologists have gradually cumulated knowledge in the field of emotion detection and voice recognition, it has attracted a new wave of interest recently by both psychologists and artificial intelligence specialists. There are several reasons for this renewed interest: technological progress in recording, storing and processing audio and visual information; the development of non-intrusive sensors; the advent of wearable computers; and the urge to enrich human-computer interface from point-and-click to sense-and-feel. Further, a new field of research in AI known as affective computing has recently been identified.

As to research on recognizing emotions in speech, on one hand, psychologists have done many experiments and suggested theories. On the other hand, AI researchers made contributions in the following areas: emotional speech synthesis, recognition of emotions and using agents for decoding and expressing emotions. Similar progress has been made with voice recognition.

In spite of the research on recognizing emotions in speech, the art has been devoid of methods and apparatuses that utilize emotion recognition and voice recognition for business purposes.

SUMMARY OF THE INVENTION

A system, method and article of manufacture are provided for comparing user versus computer emotion detection of voice signals. First, a voice signal and an emotion associated therewith are provided. Then, the emotion associated with the voice signal is determined in an automated manner and subsequently stored. Next, a user determined emotion associated with the voice signal is determined by a user and received. The automatically determined emotion with the user determined emotion are then compared.

In one aspect of the present invention, the voice signal may be emitted, received or provided in any other manner. Further, the emotion associated with the voice signal may be identified upon the emotion being provided. In such case, it may be determined whether the automatically determined emotion or the user determined emotion matches the identified emotion.

Upon user-determined emotion matching the identified emotion, a prize may be awarded to the user. As an option, the emotion may be automatically determined by extracting at least one feature from the voice signals.

BRIEF DESCRIPTION OF THE DRAWINGS

The invention will be better understood when consideration is given to the following detailed description thereof. Such description makes reference to the annexed drawings wherein.

DETAILED DESCRIPTION

In accordance with at least one embodiment of the present invention, a system is provided for performing various functions and activities through voice analysis and voice recognition. The system may be enabled using a hardware implementation such as that illustrated in FIG. 1. Further, various functional and user interface features of one embodiment of the present invention may be enabled using software programming, i.e. object oriented programming (OOP).

Hardware Overview

Figure 1:
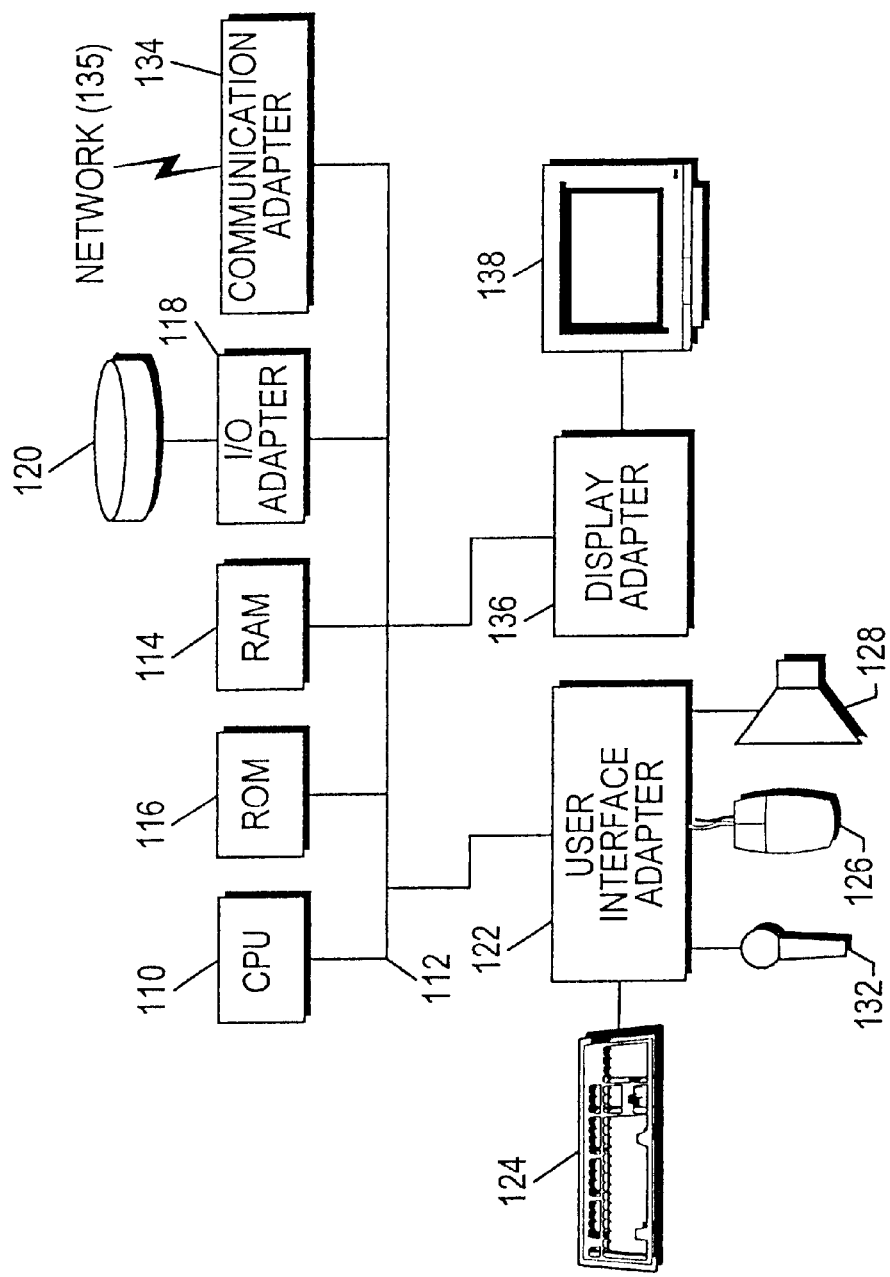
FIG. 1 is a schematic diagram of a hardware implementation of one embodiment of the present invention.

A representative hardware environment of a preferred embodiment of the present invention is depicted in FIG. 1, which illustrates a typical hardware configuration of a workstation having a central processing unit 110, such as a microprocessor, and a number of other units interconnected via a system bus 112. The workstation shown in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system.

Emotion Recognition

The present invention is directed towards utilizing recognition of emotions in speech for business purposes. Some embodiments of the present invention may be used to detect the emotion of a person based on a voice analysis and output the detected emotion of the person. Other embodiments of the present invention may be used for the detection of the emotional state in telephone call center conversations, and providing feedback to an operator or a supervisor for monitoring purposes. Yet other embodiments of the present invention may be applied to sort voice mail messages according to the emotions expressed by a caller.

If the target subjects are known, it is suggested that a study be conducted on a few of the target subjects to determine which portions of a voice are most reliable as indicators of emotion. If target subjects are not available, other subjects may be used. Given this orientation, for the following discussion:

- Data should be solicited from people who are not professional actors or actresses to improve accuracy, as actors and actresses may overemphasize a particular speech component, creating error.
- Data may be solicited from test subjects chosen from a group anticipated to be analyzed. This would improve accuracy.
- Telephone quality speech (<3.4 kHz) can be targeted to improve accuracy for use with a telephone system.
- The testing may rely on voice signal only. This means the modern speech recognition techniques would be excluded, since they require much better quality of signal & computational power.

Data Collecting & Evaluating

In an exemplary test, four short sentences are recorded from each of thirty people:

"This is not what I expected."
"I'll be right there."
"Tomorrow is my birthday."
"I'm getting married next week."

Each sentence should be recorded five times; each time, the subject portrays one of the following emotional states: happiness, anger, sadness, fear/nervousness and normal (unemotional). Five subjects can also record the sentences twice with different recording parameters. Thus, each subject has recorded 20 or 40 utterances, yielding a corpus containing 700 utterances with 140 utterances per emotional state. Each utterance can be recorded using a close-talk microphone; the first 100 utterances at 22-kHz/8 bit and the remaining 600 utterances at 22-kHz/16 bit.

After creating the corpus, an experiment may be performed to find the answers to the following questions:

- How well can people without special training portray and recognize emotions in speech?
- How well can people recognize their own emotions that they recorded 6–8 weeks earlier?
- Which kinds of emotions are easier/harder to recognize?

One important result of the experiment is selection of a set of most reliable utterances, i.e. utterances that are recognized by the most people. This set can be used as training and test data for pattern recognition algorithms run by a computer.

An interactive program of a type known in the art may be used to select and play back the utterances in random order and allow a user to classify each utterance according to its emotional content. For example, twenty-three subjects can take part in the evaluation stage and an additional 20 of whom had participated in the recording state earlier.

Table 1 shows a performance confusion matrix resulting from data collected from performance of the previously discussed study. The rows and the columns represent true & evaluated categories respectively. For example, the second row says that 11.9% of utterances that were portrayed as happy were evaluated as normal (unemotional), 61,4% as true happy, 10.1% as angry, 4.1% as sad, and 12.5% as fear. It is also seen that the most easily recognizable category is anger (72.2%) and the least recognizable category is fear (49.5%). A lot of confusion is found between sadness and fear, sadness and unemotional state and happiness and fear. The mean accuracy is 63.5% that agrees with the results of the other experimental studies.

TABLE 1

Performance Confusion Matrix

| Category | Normal | Happy | Angry | Sad | Afraid | Total |
|---|---|---|---|---|---|---|
| Normal | 66.3 | 2.5 | 7.0 | 18.2 | 6.0 | 100 |
| Happy | 11.9 | 61.4 | 10.1 | 4.1 | 12.5 | 100 |
| Angry | 10.6 | 5.2 | 72.2 | 5.6 | 6.3 | 100 |
| Sad | 11.8 | 1.0 | 4.7 | 68.3 | 14.3 | 100 |
| Afraid | 11.8 | 9.4 | 5.1 | 24.2 | 49.5 | 100 |

Table 2 shows statistics for evaluators for each emotional category and for summarized performance that was calculated as the sum of performances for each category. It can be seen that the variance for anger and sadness is much less then for the other emotional categories.

TABLE 2

Evaluators' Statistics

| Category | Mean | Std. Dev. | Median | Minimum | Maximum |
|---|---|---|---|---|---|
| Normal | 66.3 | 13.7 | 64.3 | 29.3 | 95.7 |
| Happy | 61.4 | 11.8 | 62.9 | 31.4 | 78.6 |
| Angry | 72.2 | 5.3 | 72.1 | 62.9 | 84.3 |
| Sad | 68.3 | 7.8 | 68.6 | 50.0 | 80.0 |
| Afraid | 49.5 | 13.3 | 51.4 | 22.1 | 68.6 |
| Total | 317.7 | 28.9 | 314.3 | 253.6 | 355.7 |

Table three, below, shows statistics for "actors", i.e. how well subjects portray emotions. Speaking more precisely, the numbers in the table show which portion of portrayed emotions of a particular category was recognized as this category by other subjects. It is interesting to see comparing tables 2 and 3 that the ability to portray emotions (total mean is 62.9%) stays approximately at the same level as the ability to recognize emotions (total mean is 63.2%), but the variance for portraying is much larger.

TABLE 3

Actors' Statistics

| Category | Mean | Std. Dev. | Median | Minimum | Maximum |
|---|---|---|---|---|---|
| Normal | 65.1 | 16.4 | 68.5 | 26.1 | 89.1 |
| Happy | 59.8 | 21.1 | 66.3 | 2.2 | 91.3 |
| Angry | 71.7 | 24.5 | 78.2 | 13.0 | 100.0 |
| Sad | 68.1 | 18.4 | 72.6 | 32.6 | 93.5 |
| Afraid | 49.7 | 18.6 | 48.9 | 17.4 | 88.0 |
| Total | 314.3 | 52.5 | 315.2 | 213 | 445.7 |

Table 4 shows self-reference statistics, i.e. how well subjects were able to recognize their own portrayals. We can see that people do much better in recognizing their own emotions (mean is 80.0%), especially for anger (98.1%), sadness (80.0%) and fear (78.8%). Interestingly, fear was recognized better than happiness. Some subjects failed to recognize their own portrayals for happiness and the normal state.

TABLE 4

Self-reference Statistics

| Category | Mean | Std. Dev. | Median | Minimum | Maximum |
|---|---|---|---|---|---|
| Normal | 71.9 | 25.3 | 75.0 | 0.0 | 100.0 |
| Happy | 71.2 | 33.0 | 75.0 | 0.0 | 100.0 |
| Angry | 98.1 | 6.1 | 100.0 | 75.0 | 100.0 |
| Sad | 80.0 | 22.0 | 81.2 | 25.0 | 100.0 |
| Afraid | 78.8 | 24.7 | 87.5 | 25.0 | 100.0 |
| Total | 400.0 | 65.3 | 412.5 | 250.0 | 500.0 |

From the corpus of 700 utterances five nested data sets which include utterances that were recognized as portraying the given emotion by at least p percent of the subjects (p=70, 80, 90, 95, and 100%) may be selected. For the present discussion, these data sets shall be referred to as s70, s80, s90, and s100. Table 5, below, shows the number of elements in each data set. We can see that only 7.9% of the utterances of the corpus were recognized by all subjects. And this number lineally increases up to 52.7% for the data set s70, which corresponds to the 70%-level of concordance in decoding emotion in speech.

TABLE 5 p-level Concordance Data sets

| Data set | s70 | s80 | s90 | s95 | s100 |
|---|---|---|---|---|---|
| Size | 369 | 257 | 149 | 94 | 55 |
|  | 52.7% | 36.7% | 21.3% | 13.4% | 7.9% |

These results provide valuable insight about human performance and can serve as a baseline for comparison to computer performance.

Feature Extraction

It has been found that pitch is the main vocal cue for emotion recognition. Strictly speaking, the pitch is represented by the fundamental frequency (FO), i.e. the main (lowest) frequency of the vibration of the vocal folds. The other acoustic variables contributing to vocal emotion signaling are:

Vocal energy
Frequency spectral features
Formants (usually only on or two first formants (F1, F2) are considered).
Temporal features (speech rate and pausing).

Another approach to feature extraction is to enrich the set of features by considering some derivative features such as LPC (linear predictive coding) parameters of signal or features of the smoothed pitch contour and its derivatives.

For this invention, the following strategy may be adopted. First, take into account fundamental frequency F0 (i.e. the main (lowest) frequency of the vibration of the vocal folds), energy, speaking rate, first three formants (F1, F2, and F3) and their bandwidths (BW1, BW2, and BW3) and calculate for them as many statistics as possible. Then rank the statistics using feature selection techniques, and pick a set of most "important" features.

The speaking rate can be calculated as the inverse of the average length of the voiced part of utterance. For all other parameters, the following statistics can be calculated: mean, standard deviation, minimum, maximum and range. Additionally for F0 the slope can be calculated as a linear regression for voiced part of speech, i.e. the line that fits the pitch contour. The relative voiced energy can also be calculated as the proportion of voiced energy to the total energy of utterance. Altogether, there are about 40 features for each utterance.

The RELIEF-F algorithm may be used for feature selection. For example, the RELIEF-F may be run for the s70 data set varying the number of nearest neighbors from 1 to 12, and the features ordered according to their sum of ranks. The top 14 features are the following: F0 maximum, F0 standard deviation, F0 range, F0 mean, BW1 mean, BW2 mean, energy standard deviation, speaking rate, F0 slope, F1 maximum, energy maximum, energy range, F2 range, and F1 range. To investigate how sets of features influence the accuracy of emotion recognition algorithms, three nested sets of features may be formed based on their sum of ranks. The first set includes the top eight features (from F0 maximum speaking rate), the second set extends the first one by two next features (F0 slope and F1 maximum), and the third set includes all 14 top features. More details on the RELIEF-F algorithm are set forth in the publication Proc. European Conf. On Machine Learning (1994) in the article by I. Kononenko entitled "Estimating attributes: Analysis and extension of RELIEF" and found on pages 171–182.

A RELIEF algorithm estimates attributes according to how well their values distinguish themselves among instances that are near each other. In the present invention, the attributes are the features that are analyzed as set forth above. During operation, the RELIEF algorithm searches for its two nearest neighbors: one from the same class (called nearest hit) and the other from a different class (called nearest miss). A RELIEF algorithm's estimate W[A] of an attribute A is an approximation of the following difference of probabilities: W[A]=P(different value of A|nearest instance from different class)—P(different value of A|nearest instance from same class). Good attributes differentiate between instances from the same class.

The original RELIEF algorithm deals with discrete and continuous attributes and is limited to only-two class problems. The RELIEF algorithm is set forth below:

```
set all weights W[A]:=0.0;
    for i:=1 to m do
        begin
        randomly select and instance R;
        find nearest hit H and nearest miss M;
        for A:=1 to all attributes do
            W[A]:=W[A]—diff(A,R,H)/+diff (A,R,M)/m;
        end;
``` where diff(Attribute, Instance 1, Instance 2) calculates the difference between the values of attributes for two instances.

With discrete attributes the difference is either 1 (the values are different) or 0 (the values are the same), while for continuous attributes the difference is the actual difference normalized to the interval [0,1]. Normalization with m guarantees that all weights are in the interval [−1,1].

Function diff is used to calculate the distance between instances to find the nearest neighbors. The total distance is the sum of differences over all attributes. RELIEF approximates the difference between the attributes. Parameter m represents the number of instances for approximating probabilities. The larger m implies more reliable information. However, m cannot exceed the number of available training instances. The selection of the nearest neighbors is important in RELIEF. The goal is to find nearest neighbors with respect to important attributes.

The RELIEF-F algorithm is designed to handle noisy, incomplete, and multi-class data sets. Instead of finding one near miss M from a different class, the RELIEF-F algorithm finds one near miss M(C) for each different class and averages their contribution for updating estimates W[A]. The average is weighted with prior probabilities of each class. The RELIEF-F algorithm can be set forth as follows:

$$W[A] := W[A] - \text{diff}(A, R, H)/m + \sum_{C \neq \text{class}(R)} [P(C) \times \text{diff}(A, R, M(C))]/m$$

The algorithm estimates the ability of attributes to separate each pair of classes regardless of which two classes are closest to each other. As set forth above, the extensions incorporated into the RELIEF-F algorithm enable it to deal with noisy and incomplete data sets and, most importantly, it can efficiently deal with multi-class problems.

Figure 2:
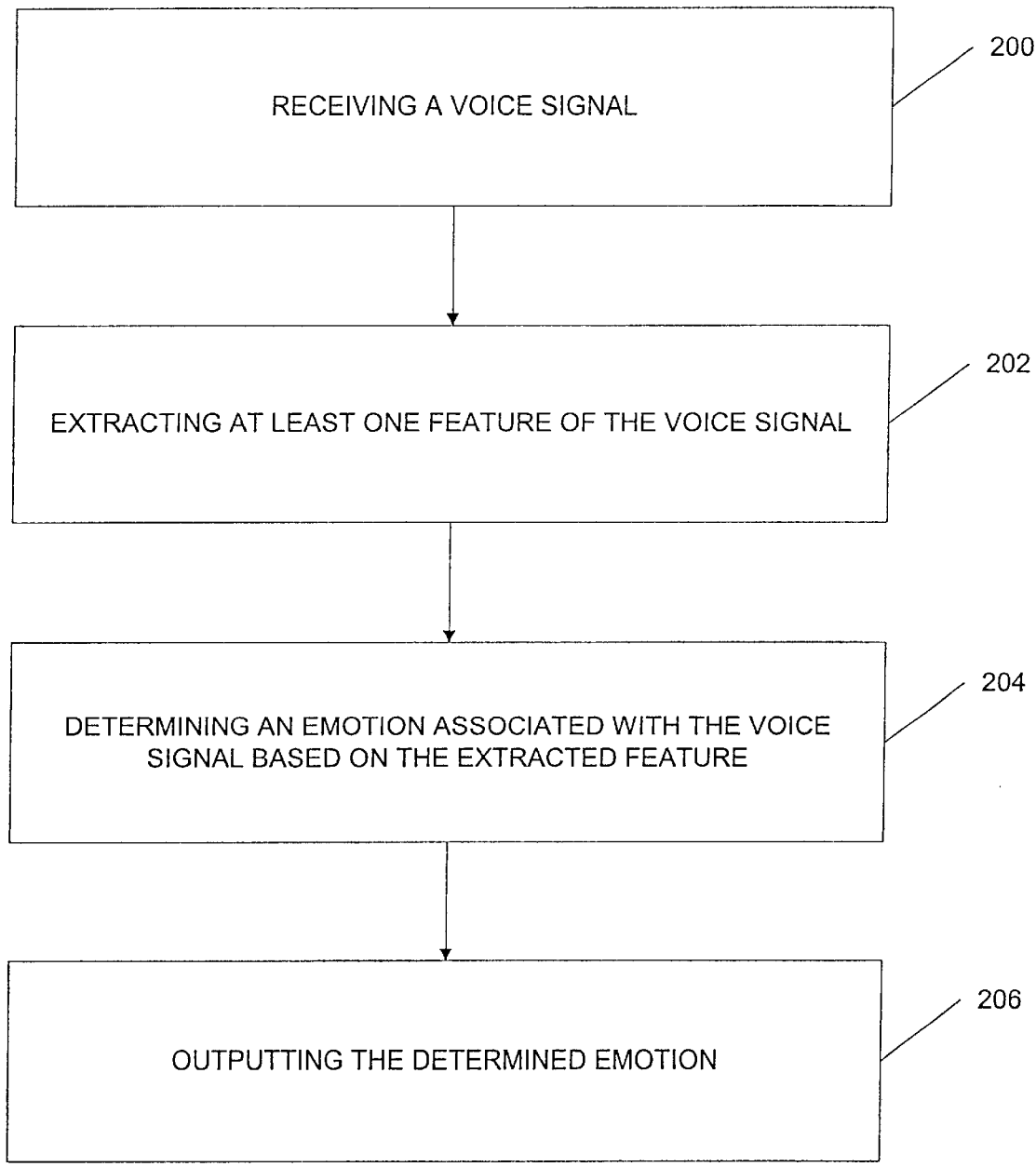
FIG. 2 is a flowchart depicting one embodiment of the present invention that detects emotion using voice analysis.

FIG. 2 illustrates one embodiment of the present invention that detects emotion using voice analysis. In operation 200, a voice signal is received, such as by a microphone or in the form of a digitized sample. A predetermined number of features of the voice signal are extracted as set forth above and selected in operation 202. These features include, but are not limited to, a maximum value of a fundamental frequency, a standard deviation of the fundamental frequency, a range of the fundamental frequency, a mean of the fundamental frequency, a mean of a bandwidth of a first formant, a mean of a bandwidth of a second formant, a standard deviation of energy, a speaking rate, a slope of the fundamental frequency, a maximum value of the first formant, a maximum value of the energy, a range of the energy, a range of the second formant, and a range of the first formant. Utilizing the features selected in operation 202, an emotion associated with the voice signal is determined in operation 204 based on the extracted feature. Finally, in operation 206, the determined emotion is output. See the discussion below, particularly with reference to FIGS. 8 and 9, for a more detailed discussion of determining an emotion based on a voice signal in accordance with the present invention.

Preferably, the feature of the voice signal is selected from the group of features consisting of the maximum value of the fundamental frequency, the standard deviation of the fundamental frequency, the range of the fundamental frequency, the mean of the fundamental frequency, the mean of the bandwidth of the first formant, the mean of the bandwidth of the second formant, the standard deviation of energy, and the speaking rate. Ideally, the extracted feature includes at least one of the slope of the fundamental frequency and the maximum value of the first formant.

Optionally, a plurality of features are extracted including the maximum value of the fundamental frequency, the standard deviation of the fundamental frequency, the range of the fundamental frequency, the mean of the fundamental frequency, the mean of the bandwidth of the first formant, the mean of the bandwidth of the second formant, the standard deviation of energy, and the speaking rate. Preferably, the extracted features include the slope of the fundamental frequency and the maximum value of the first formant.

As another option, a plurality of features are extracted including the maximum value of the fundamental frequency, the standard deviation of the fundamental frequency, the range of the fundamental frequency, the mean of the fundamental frequency, the mean of the bandwidth of the first formant, the mean of the bandwidth of the second formant, the standard deviation of energy, the speaking rate, the slope of the fundamental frequency, the maximum value of the first formant, the maximum value of the energy, the range of the energy, the range of the second formant, and the range of the first formant.

Computer Performance

To recognize emotions in speech, two exemplary approaches may be taken: neural networks and ensembles of classifiers. In the first approach, a two-layer back propagation neural network architecture with a 8-, 10- or 14-element input vector, 10 or 20 nodes in the hidden sigmoid layer and five nodes in the output linear layer may be used. The number of outputs corresponds to the number of emotional categories. To train and test the algorithms, data sets s70, s80, and s90 may be used. These sets can be randomly split into training (67% of utterances) and test (33%) subsets. Several neural network classifiers trained with different initial weight matrices may be created. This approach, when applied to the s70 data set and the 8-feature set above, gave the average accuracy of about 55% with the following distribution for emotional categories: normal state is 40–50%, happiness is 55–65%, anger is 60–80%, sadness is 60–70%, and fear is 20–40%.

For the second approach, ensembles of classifiers are used. An ensemble consists of an odd number of neural network classifiers, which have been trained on different subsets of the training set using the bootstrap aggregation and cross-validated committees techniques. The ensemble makes decisions based on the majority voting principle. Suggested ensemble sizes are from 7 to 15.

Figure 3:
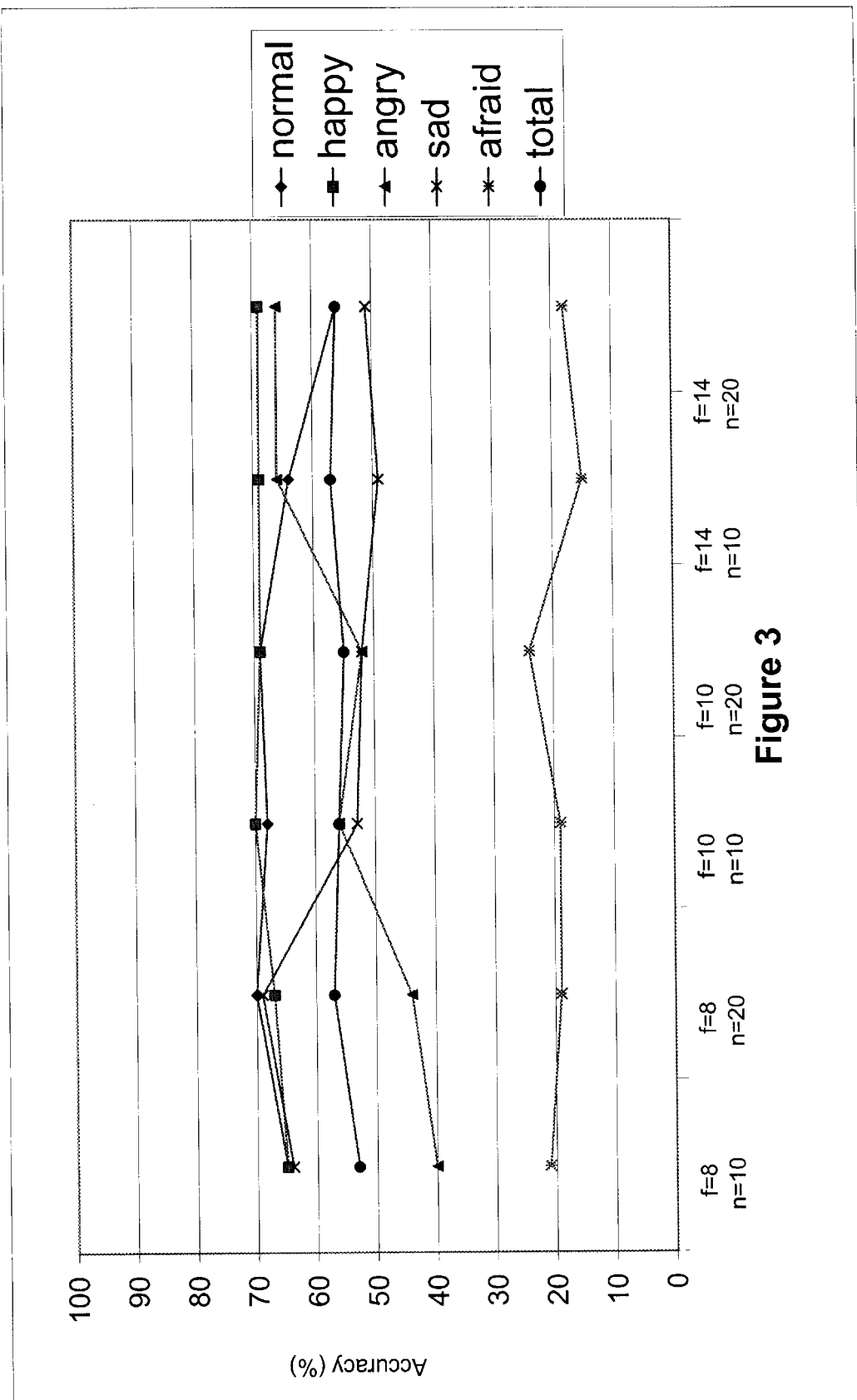
FIG. 3 is a graph showing the average accuracy of recognition for an s70 data set.

FIG. 3 shows the average accuracy of recognition for an s70 data set, all three sets of features, and both neural network architectures (10 and 20 neurons in the hidden layer). It can be seen that the accuracy for happiness stays the same (~68%) for the different sets of features and architectures. The accuracy for fear is rather low (15–25%). The accuracy for anger is relatively low (40–45%) for the 8-feature set and improves dramatically (65%) for the 14-feature set. But the accuracy for sadness is higher for the 8-feature set than for the other sets. The average accuracy is about 55%. The low accuracy for fear confirms the theoretical result which says that if the individual classifiers make uncorrelated errors are rates exceeding 0.5 (it is 0.6–0.8 in our case) then the error rate of the voted ensemble increases.

Figure 4:
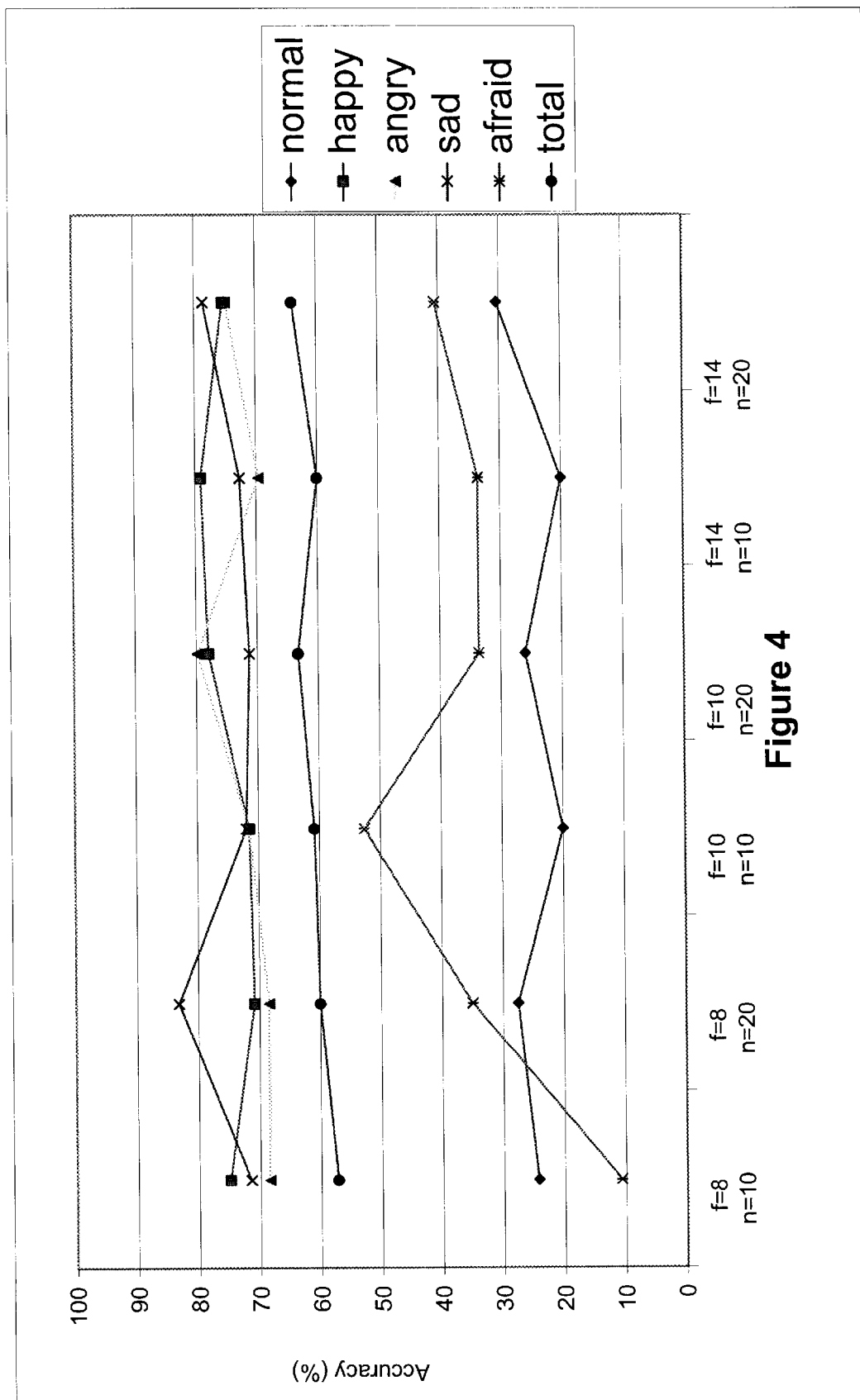
FIG. 4 is a chart illustrating the average accuracy of recognition for an s80 data set.

FIG. 4 shows results for an s80 data set. It is seen that the accuracy for normal state is low (20–30%). The accuracy for fear changes dramatically from 11% for the 8-feature set and 10-neuron architecture to 53% for the 10-feature and 10-neuron architecture. The accuracy for happiness, anger and sadness is relatively high (68–83%) The average accuracy (~61%) is higher than for the s70 data set.

Figure 5:
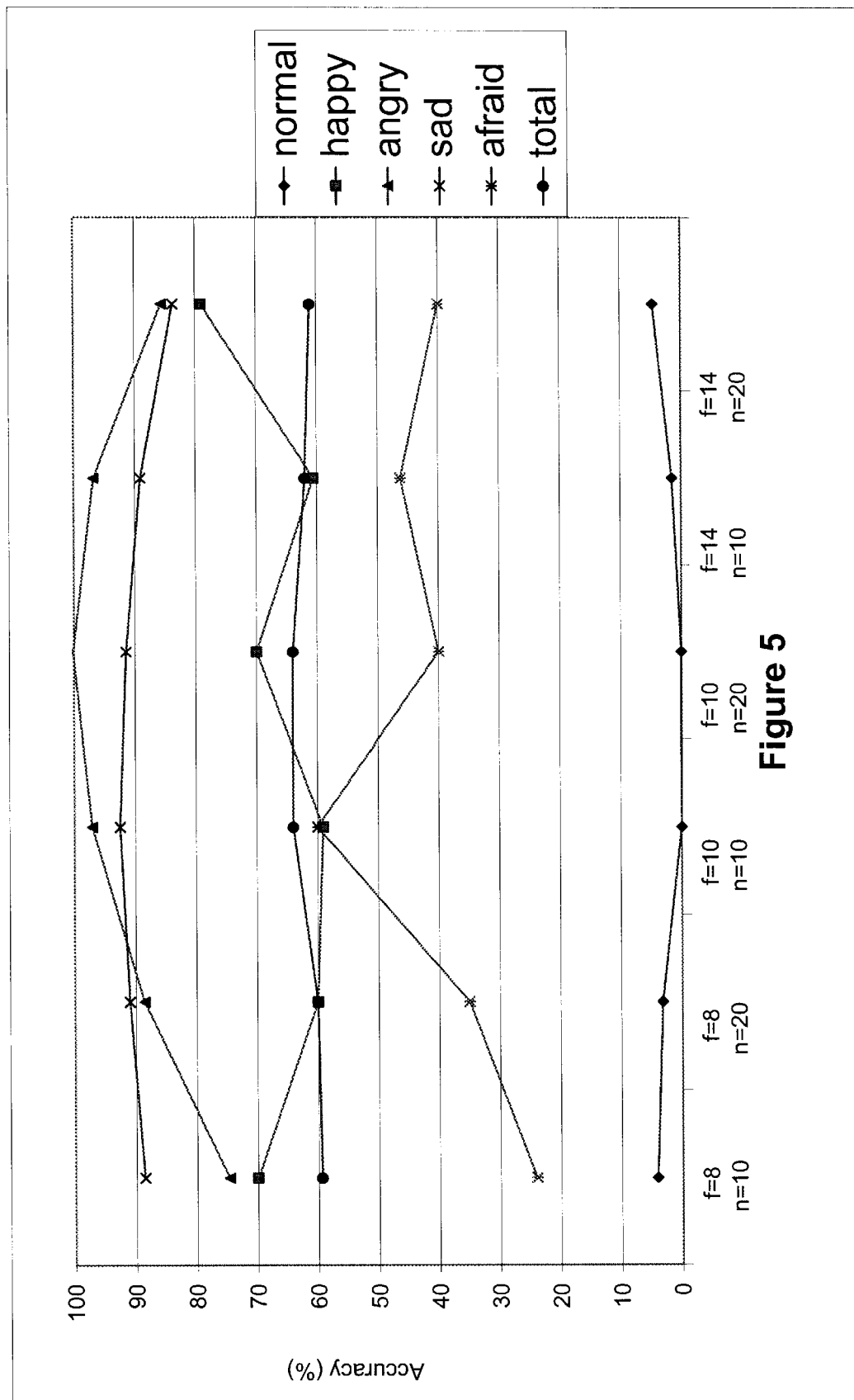
FIG. 5 is a graph depicting the average accuracy of recognition for an s90 data set.

FIG. 5 shows results for an s90 data set. We can see that the accuracy for fear is higher (25–60%) but it follows the same pattern shown for the s80 data set. The accuracy for sadness and anger is very high: 75–100% for anger and 88–93% for sadness. The average accuracy (62%) is approximately equal to the average accuracy for the s80 data set.

Figure 6:
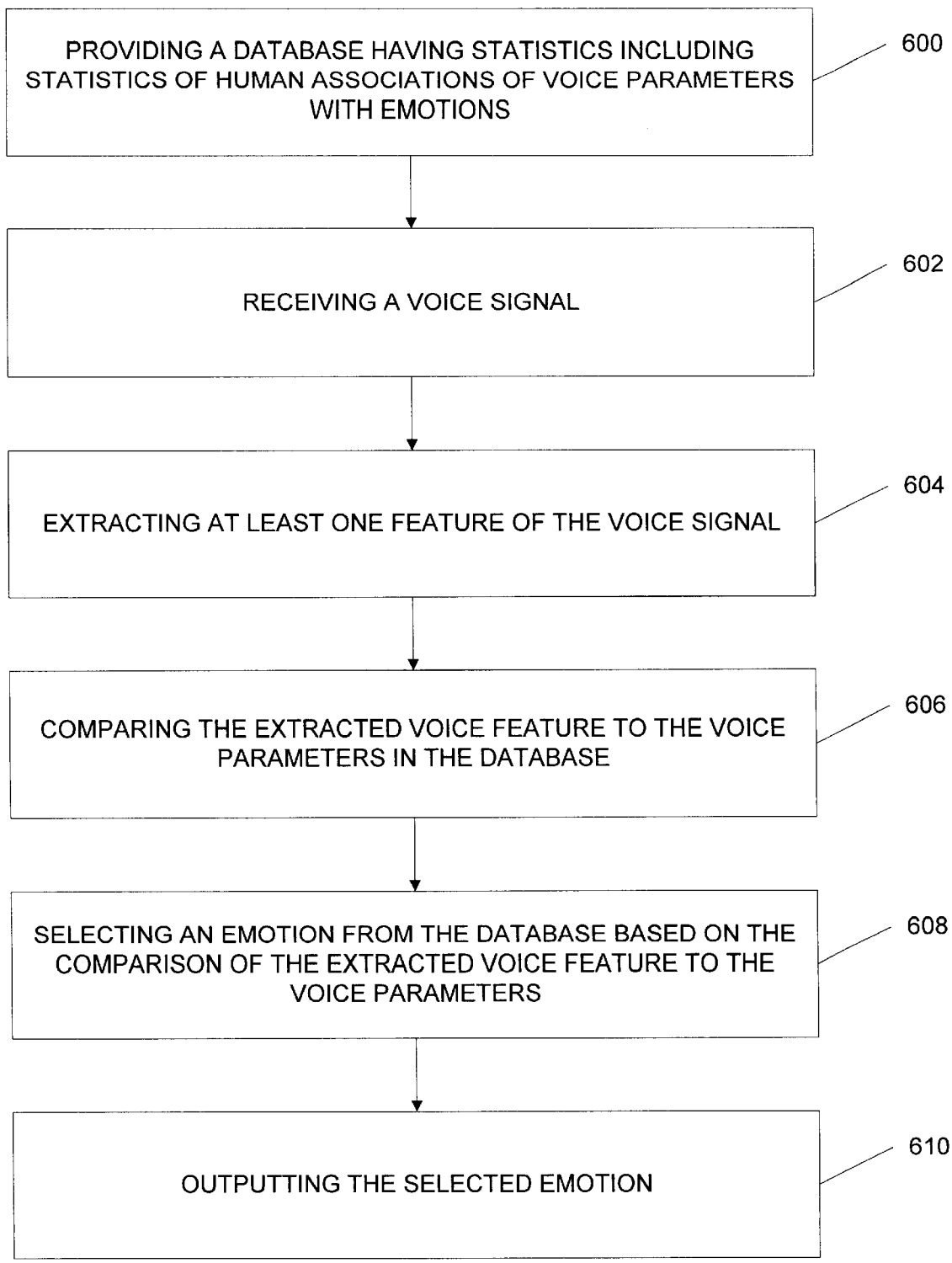
FIG. 6 is a flow chart illustrating an embodiment of the present invention that detects emotion using statistics.

FIG. 6 illustrates an embodiment of the present invention that detects emotion using statistics. First, a database is provided in operation 600. The database has statistics including statistics of human associations of voice parameters with emotions, such as those shown in the tables above and FIGS. 3 through 5. Further, the database may include a series of voice pitches associated with fear and another series of voice pitches associated with happiness and a range of error for certain pitches. Next, a voice signal is received in operation 602. In operation 604, one or more features are extracted from the voice signal. See the Feature extraction section above for more details on extracting features from a voice signal. Then, in operation 606, the extracted voice feature is compared to the voice parameters in the database. In operation 608, an emotion is selected from the database based on the comparison of the extracted voice feature to the voice parameters. This can include, for example, comparing digitized speech samples from the database with a digitized sample of the feature extracted from the voice signal to create a list of probable emotions and then using algorithms to take into account statistics of the accuracy of humans in recognizing the emotion to make a final determination of the most probable emotion. The selected emotion is finally output in operation 610. Refer to the section entitled Exemplary Apparatuses for Detecting Emotion in Voice Signals, below, for computerized mechanisms to perform emotion recognition in speech.

In one aspect of the present invention, the database includes probabilities of particular voice features being associated with an emotion. Preferably, the selection of the emotion from the database includes analyzing the probabilities and selecting the most probable emotion based on the probabilities. Optionally, the probabilities of the database may include performance confusion statistics, such as are shown in the Performance Confusion Matrix above. Also optionally, the statistics in the database may include self-recognition statistics, such as shown in the Tables above.

In another aspect of the present invention, the feature that is extracted includes a maximum value of a fundamental frequency, a standard deviation of the fundamental frequency, a range of the fundamental frequency, a mean of the fundamental frequency, a mean of a bandwidth of a first formant, a mean of a bandwidth of a second formant, a standard deviation of energy, a speaking rate, a slope of the fundamental frequency, a maximum value of the first formant, a maximum value of the energy, a range of the energy, a range of the second formant, and/or a range of the first formant.

Figure 7:
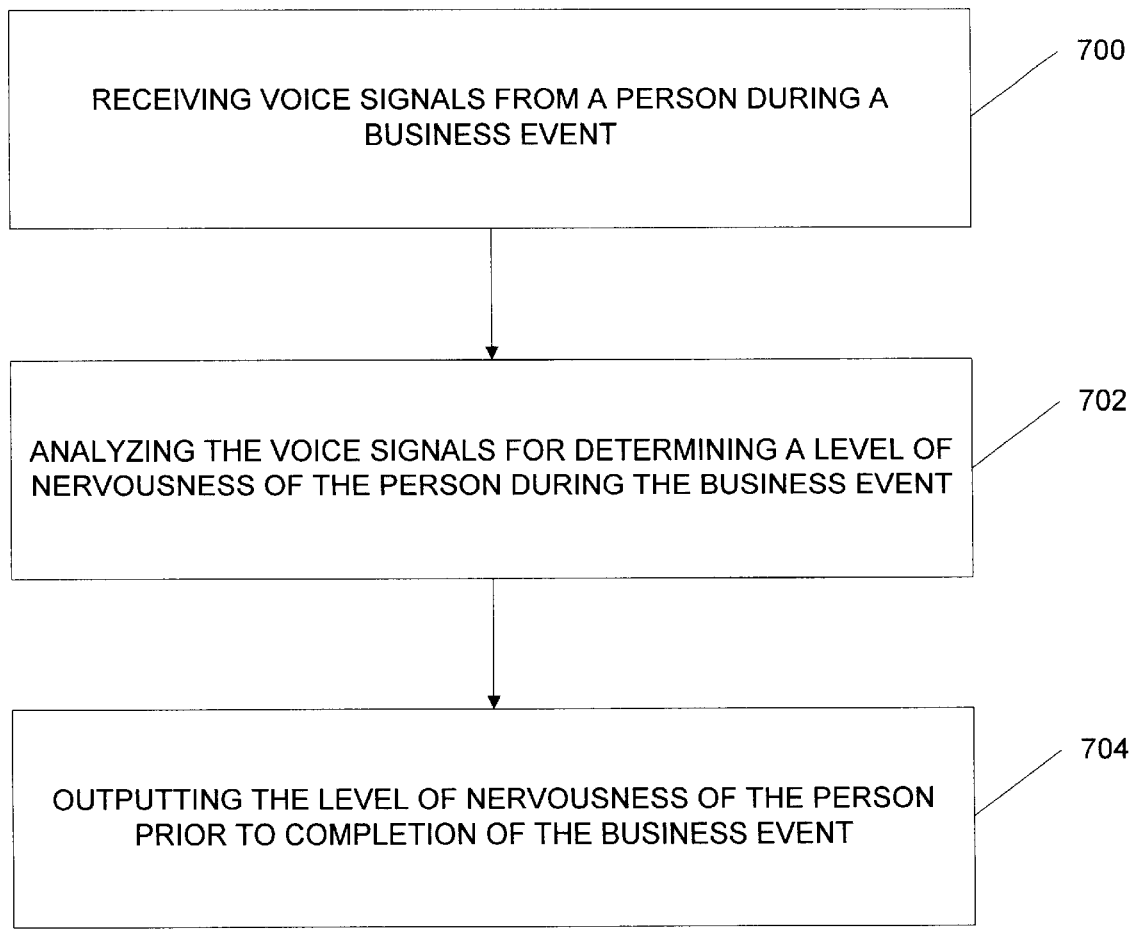
FIG. 7 is a flow chart illustrating a method for detecting nervousness in a voice in a business environment to help prevent fraud.

FIG. 7 is a flow chart illustrating a method for detecting nervousness in a voice in a business environment to help prevent fraud. First, in operation 700, voice signals are received from a person during a business event. For example, the voice signals may be created by a microphone in the proximity of the person, may be captured from a telephone tap, etc. The voice signals are analyzed during the business event in operation 702 to determine a level of nervousness of the person. The voice signals may be analyzed as set forth above. In operation 704, an indication of the level of nervousness is output, preferably before the business event is completed so that one attempting to prevent fraud can make an assessment whether to confront the person before the person leaves. Any kind of output is acceptable, including paper printout or a display on a computer screen. It is to be understood that this embodiment of the invention may detect emotions other than nervousness. Such emotions include stress and any other emotion common to a person when committing fraud.

This embodiment of the present invention has particular application in business areas such as contract negotiation, insurance dealings, customer service, etc. Fraud in these areas cost companies millions each year. Fortunately, the present invention provides a tool to help combat such fraud. It should also be noted that the present invention has applications in the law enforcement arena as well as in a courtroom environment, etc.

Preferably, a degree of certainty as to the level of nervousness of the person is output to assist one searching for fraud in making a determination as to whether the person was speaking fraudulently. This may be based on statistics as set forth above in the embodiment of the present invention with reference to FIG. 6. Optionally, the indication of the level of nervousness of the person may be output in real time to allow one seeking to prevent fraud to obtain results very quickly so he or she is able to challenge the person soon after the person makes a suspicious utterance.

As another option, the indication of the level of nervousness may include an alarm that is set off when the level of nervousness goes above a predetermined level. The alarm may include a visual notification on a computer display, an auditory sound, etc. to alert an overseer, the listener, and/or one searching for fraud. The alarm could also be connected to a recording device which would begin recording the conversation when the alarm was set off, if the conversation is not already being recorded.

The alarm options would be particularly useful in a situation where there are many persons taking turns speaking. One example would be in a customer service department or on the telephone to a customer service representative. As each customer takes a turn to speak to a customer service representative, the present invention would detect the level of nervousness in the customer's speech. If the alarm was set off because the level of nervousness of a customer crossed the predetermined level, the customer service representative could be notified by a visual indicator on his or her computer screen, a flashing light, etc. The customer service representative, now aware of the possible fraud, could then seek to expose the fraud if any exists. The alarm could also be used to notify a manager as well. Further, recording of the conversation could begin upon the alarm being activated.

In one embodiment of the present invention, at least one feature of the voice signals is extracted and used to determine the level of nervousness of the person. Features that may be extracted include a maximum value of a fundamental frequency, a standard deviation of the fundamental frequency, a range of the fundamental frequency, a mean of the fundamental frequency, a mean of a bandwidth of a first formant, a mean of a bandwidth of a second formant, a standard deviation of energy, a speaking rate, a slope of the fundamental frequency, a maximum value of the first formant, a maximum value of the energy, a range of the energy, a range of the second formant, and a range of the first formant. Thus, for example, a degree of wavering in the tone of the voice, as determined from readings of the fundamental frequency, can be used to help determine a level of nervousness. The greater the degree of wavering, the higher the level of nervousness. Pauses in the person's speech may also be taken into account.

The following section describes apparatuses that may be used to determine emotion, including nervousness, in voice signals.

Exemplary Apparatuses for Detecting Emotion in Voice Signals

This section describes several apparatuses for analyzing speech in accordance with the present invention.

One embodiment of the present invention includes an apparatus for analyzing a person's speech to determine their emotional state. The analyzer operates on the real time frequency or pitch components within the first formant band of human speech. In analyzing the speech, the apparatus analyses certain value occurrence patterns in terms of differential first formant pitch, rate of change of pitch, duration and time distribution patterns. These factors relate in a complex but very fundamental way to both transient and long term emotional states.

Human speech is initiated by two basic sound generating mechanisms. The vocal cords; thin stretched membranes under muscle control, oscillate when expelled air from the lungs passes through them. They produce a characteristic "buzz" sound at a fundamental frequency between 80 Hz and 240 Hz. This frequency is varied over a moderate range by both conscious and unconscious muscle contraction and relaxation. The wave form of the fundamental "buzz" contains many harmonics, some of which excite resonance is various fixed and variable cavities associated with the vocal tract. The second basic sound generated during speech is a pseudo-random noise having a fairly broad and uniform frequency distribution. It is caused by turbulence as expelled air moves through the vocal tract and is called a "hiss" sound. It is modulated, for the most part, by tongue movements and also excites the fixed and variable cavities. It is this complex mixture of "buzz" and "hiss" sounds, shaped and articulated by the resonant cavities, which produces speech.

In an energy distribution analysis of speech sounds, it will be found that the energy falls into distinct frequency bands called formants. There are three significant formants. The system described here utilizes the first formant band, which extends from the fundamental "buzz" frequency to approximately 1000 Hz. This band has not only the highest energy content but reflects a high degree of frequency modulation as a function of various vocal tract and facial muscle tension variations.

In effect, by analyzing certain first formant frequency distribution patterns, a qualitative measure of speech related muscle tension variations and interactions is performed. Since these muscles are predominantly biased and articulated through secondary unconscious processes, which are in turn influenced by emotional state, a relative measure of emotional activity can be determined independent of a person's awareness or lack of awareness of that state. Research also bears out a general supposition that since the mechanisms of speech are exceedingly complex and largely autonomous, very few people are able to consciously "project" a fictitious emotional state. In fact, an attempt to do so usually generates its own unique psychological stress "fingerprint" in the voice pattern.

Because of the characteristics of the first formant speech sounds, the present invention analyses an FM demodulated first formant speech signal and produces an output indicative of nulls thereof.

The frequency or number of nulls or "flat" spots in the FM demodulated signal, the length of the nulls and the ratio of the total time that nulls exist during a word period to the overall time of the word period are all indicative of the emotional state of the individual. By looking at the output of the device, the user can see or feel the occurrence of the nulls and thus can determine by observing the output the number or frequency of nulls, the length of the nulls and the ratio of the total time nulls exist during a word period to the length of the word period, the emotional state of the individual.

In the present invention, the first formant frequency band of a speech signal is FM demodulated and the FM demodulated signal is applied to a word detector circuit, which detects the presence of an FM demodulated signal. The FM demodulated signal is also applied to a null detector means which detects the nulls in the FM demodulated signal and produces an output indicative thereof. An output circuit is coupled to the word detector and to the null detector. The output circuit is enabled by the word detector when the word detector detects the presence of an FM demodulated signal, and the output circuit produces an output indicative of the presence or non-presence of a null in the FM demodulated signal. The output of the output circuit is displayed in a manner in which it can be perceived by a user so that the user is provided with an indication of the existence of nulls in the FM demodulated signal. The user of the device thus monitors the nulls and can thereby determine the emotional state of the individual whose speech is being analyzed.

In another embodiment of the present invention, the voice vibrato is analyzed. The so-called voice vibrato has been established as a semi-voluntary response which might be of value in studying deception along with certain other reactions; such as respiration volume; inspiration-expiration ratios; metabolic rate; regularity and rate of respiration; association of words and ideas; facial expressions; motor reactions; and reactions to certain narcotics; however, no useable technique has been developed previously which permits a valid and reliable analysis of voice changes in the clinical determination of a subject's emotional state, opinions, or attempts to deceive.

Early experiments involving attempts to correlate voice quality changes with emotional stimuli have established that human speech is affected by strong emotion. Detectable changes in the voice occur much more rapidly, following stress stimulation, than do the classic indications of physiological manifestations resulting from the functioning of the autonomic nervous system.

Two types of voice change as a result of stress. The first of these is referred to as the gross change, which usually occurs only as a result of a substantially stressful situation. This change manifests itself in audible perceptible changes in speaking rate, volume, voice tremor, change in spacing between syllables, and a change in the fundamental pitch or frequency of the voice. This gross change is subject to conscious control, at least in some subjects, when the stress level is below that of a total loss of control.

The second type of voice change is that of voice quality. This type of change is not discernible to the human ear, but is an apparently unconscious manifestation of the slight tensing of the vocal cords under even minor stress, resulting in a dampening of selected frequency variations. When graphically portrayed, the difference is readily discernible between unstressed or normal vocalization and vocalization under mild stress, attempts to deceive, or adverse attitudes. These patterns have held true over a wide range of human voices of both sexes, various ages, and under various situational conditions. This second type of change is not subject to conscious control.

There are two types of sound produced by the human vocal anatomy. The first type of sound is a product of the vibration of the vocal cords, which, in turn, is a product of partially closing the glottis and forcing air through the glottis by contraction of the lung cavity and the lungs. The frequencies of these vibrations can vary generally between 100 and 300 Hertz, depending upon the sex and age of the speaker and upon the intonations the speaker applies. This sound has a rapid decay time.

The second type of sound involves the formant frequencies. This constitutes sound that results from the resonance of the cavities in the head, including the throat, the mouth, the nose and the sinus cavities. This sound is created by excitation of the resonant cavities by a sound source of lower frequencies, in the case of the vocalized sound produced by the vocal cords, or by the partial restriction of the passage of air from the lungs, as in the case of unvoiced fricatives. Whichever the excitation source, the frequency of the formant is determined by the resonant frequency of the cavity involved. The formant frequencies appear generally about 800 Hertz and appear in distinct frequency bands that correspond to the resonant frequency of the individual cavities. The first, or lowest, formant is that created by the mouth and throat cavities and is notable for its frequency shift as the mouth changes its dimensions and volume in the formation of various sounds, particularly vowel sounds. The highest formant frequencies are more constant because of the more constant volume of the cavities. The formant wave forms are ringing signals, as opposed to the rapid decay signals of the vocal cords. When voiced sounds are uttered, the voice wave forms are imposed upon the formant wave forms as amplitude modulations.

It has been discovered that a third signal category exists in the human voice and that this third signal category is related to the second type of voice change discussed above. This is an infrasonic, or subsonic, frequency modulation which is present, in some degree, in both the vocal cord sounds and in the formant sounds. This signal is typically between 8 and 12 Hertz. Accordingly, it is not audible to the human ear. Because of the fact that this characteristic constitutes frequency modulation, as distinguished from amplitude modulation, it is not directly discernible on time-base/amplitude chart recordings. Because of the fact that this infrasonic signal is one of the more significant voice indicators of psychological stress, it will be dealt with in greater detail.

There are in existence several analogies which are used to provide schematic representations of the entire voice process. Both mechanical and electronic analogies are successfully employed, for example, in the design of computer voices. These analogies, however, consider the voiced sound source (vocal cords) and the walls of the cavities as hard and constant features. However, both the vocal cords and the walls of the major formant-producing cavities constitute, in reality, flexible tissue that is immediately responsive to the complex array of muscles which provide control of the tissue. Those muscles which control the vocal cords through the mechanical linkage of bone and cartilage allow both the purposeful and automatic production of voice sound and variation of voice pitch by an individual. Similarly, those muscles which control the tongue, lips and throat allow both the purposeful and the automatic control of the first formant frequencies. Other formants can be affected similarly to a more limited degree.

It is worthy of note that, during normal speech, these muscles are performing at a small percentage of their total work capability. For this reason, in spite of their being employed to change the position of the vocal cords and the positions of the lips, tongue, and inner throat walls, the muscles remain in a relatively relaxed state. It has been determined that during this relatively relaxed state a natural muscular undulation occurs typically at the 8–12 Hertz frequency previously mentioned. This undulation causes a slight variation in the tension of the vocal cords and causes shifts in the basic pitch frequency of the voice. Also, the undulation varies slightly the volume of the resonant cavity (particularly that associated with the first formant) and the elasticity of the cavity walls to cause shifts in the formant frequencies. These shifts about a central frequency constitute a frequency modulation of the central or carrier frequency.

It is important to note that neither of the shifts in the basic pitch frequency of the voice or in the formant frequencies is detectable directly by a listener, partly because the shifts are very small and partly because they exist primarily in the inaudible frequency range previously mentioned.

In order to observe this frequency modulation any one of several existing techniques for the demodulation of frequency modulation can be employed, bearing in mind, of course, that the modulation frequency is the nominal 8–12 Hertz and the carrier is one of the bands within the voice spectrum.

In order to more fully understand the above discussion, the concept of a "center of mass" of this wave form must be understood. It is possible to approximately determine the midpoint between the two extremes of any single excursion of the recording pen. If the midpoints between extremes of all excursions are marked and if those midpoints are then approximately joined by a continuous curve, it will be seen that a line approximating an average or "center of mass" of the entire wave form will result. Joining all such marks, with some smoothing, results in a smooth curved line. The line represents the infrasonic frequency modulation resulting from the undulations previously described.

As mentioned above, it has been determined that the array of muscles associated with the vocal cords and cavity walls is subject to mild muscular tension when slight to moderate psychological stress is created in the individual examination. This tension, indiscernible to the subject and similarly indiscernible by normal unaided observation techniques to the examiner, is sufficient to decrease or virtually eliminate the muscular undulations present in the unstressed subject, thereby removing the basis for the carrier frequency variations which produce the infrasonic frequency modulations.

While the use of the infrasonic wave form is unique to the technique of employing voice as the physiological medium for psychological stress evaluation, the voice does provide for additional instrumented indications of aurally indiscernible physiological changes as a result of psychological stress, which physiological changes are similarly detectable by techniques and devices in current use. Of the four most often used physiological changes previously mentioned (brain wave patterns, heart activity, skin conductivity and breathing activity) two of these, breathing activity and heart activity, directly and indirectly affect the amplitude and the detail of an oral utterance wave form and provide the basis for a more gross evaluation of psychological stress, particularly when the testing involves sequential vocal responses.

Figure 8:
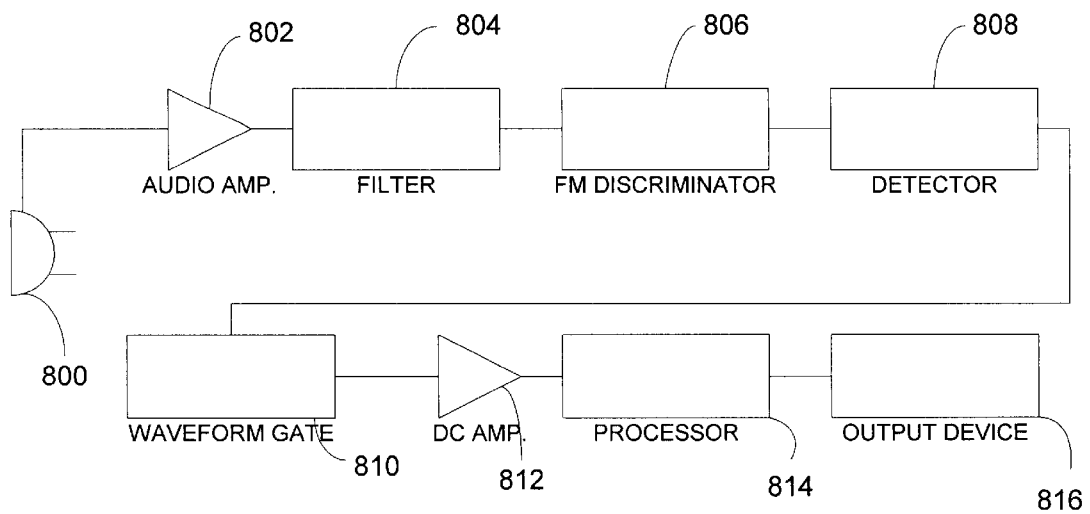
FIG. 8 is a flow diagram depicting an apparatus for detecting emotion from a voice sample in accordance with one embodiment of the present invention.

Another apparatus is shown in FIG. 8. As shown, a transducer 800 converts the sound waves of the oral utterances of the subject into electrical signals wherefrom they are connected to the input of an audio amplifier 802 which is simply for the purpose of increasing the power of electrical signals to a more stable, usable level. The output of amplifier 802 is connected to a filter 804 which is primarily for the purpose of eliminating some undesired low frequency components and noise components.

After filtering, the signal is connected to an FM discriminator 806 wherein the frequency deviations from the center frequency are converted into signals which vary in amplitude. The amplitude varying signals are then detected in a detector circuit 808 for the purpose of rectifying the signal and producing a signal, which constitutes a series of half wave pulses. After detection, the signal is connected to an integrator circuit 810 wherein the signal is integrated to the desired degree. In circuit 810, the signal is either integrated to a very small extent, producing a wave form, or is integrated to a greater degree, producing a signal. After integration, the signal is amplified in an amplifier 812 and connected to a processor 814 which determines the emotion associated with the voice signal. An output device 816 such as a computer screen or printer is used to output the detected emotion. Optionally, statistical data may be output as well.

Figure 9:
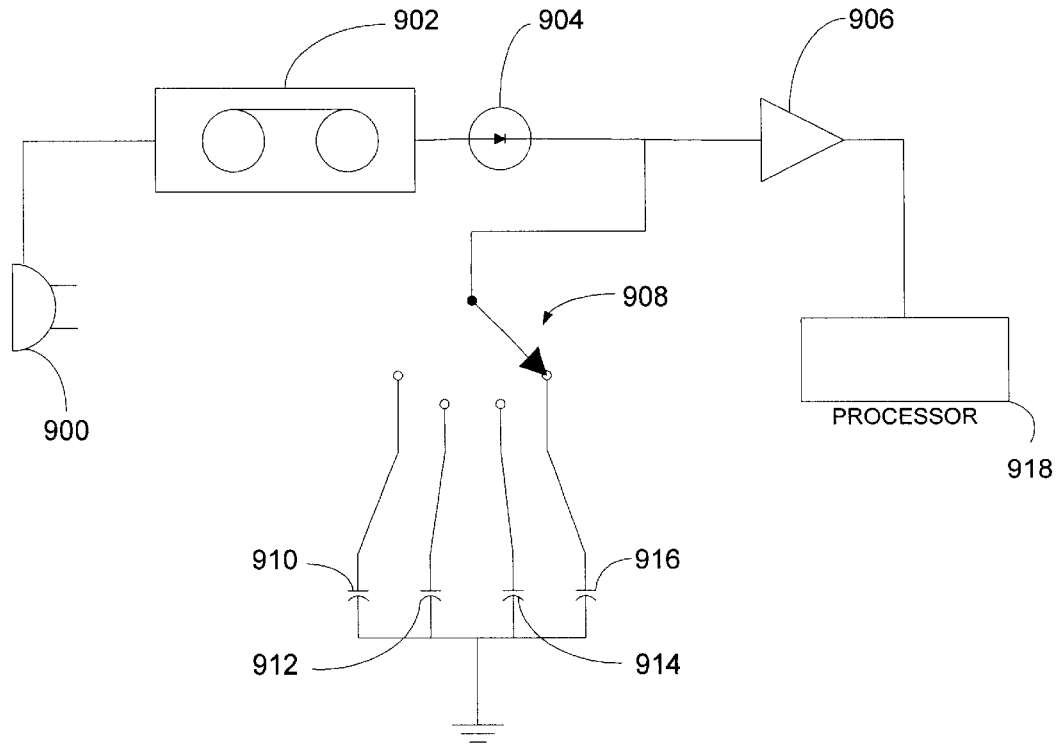
FIG. 9 is a flow diagram illustrating an apparatus for producing visible records from sound in accordance with one embodiment of the invention.

A somewhat simpler embodiment of an apparatus for producing visible records in accordance with the invention is shown in FIG. 9 wherein the acoustic signals are transduced by a microphone 900 into electrical signals that are magnetically recorded in a tape recording device 902. The signals can then be processed through the remaining equipment at various speeds and at any time, the play-back being connected to a conventional semiconductor diode 904 which rectifies the signals. The rectified signals are connected to the input of a conventional amplifier 906 and also to the movable contact of a selector switch indicated generally at 908. The movable contact of switch 908 can be moved to any one of a plurality of fixed contacts, each of which is connected to a capacitor. In FIG. 9 is shown a selection of four capacitors 910, 912, 914 and 916, each having one terminal connected to a fixed contact of the switch and the other terminal connected to ground. The output of amplifier 906 is connected to a processor 918.

A tape recorder that may be used in this particular assembly of equipment was a Uher model 4000 four-speed tape unit having its own internal amplifier. The values of capacitors 910–916 were 0.5, 3, 10 and 50 microfarads, respectively, and the input impedance of amplifier 906 was approximately 10,000 ohms. As will be recognized, various other components could be, or could have been, used in this apparatus.

In the operation of the circuit of FIG. 9, the rectified wave form emerging through diode 904 is integrated to the desired degree, the time constant being selected so that the effect of the frequency modulated infrasonic wave appears as a slowly varying DC level that approximately follows the line representing the "center of mass" of the waveform. The excursions shown in that particular diagram are relatively rapid, indicating that the switch was connected to one of the lower value capacitors. In this embodiment composite filtering is accomplished by the capacitor 910, 912, 914 or 916, and, in the case of the playback speed reduction, the tape recorder.

Telephonic Operation with Operator Feedback

Figure 10:
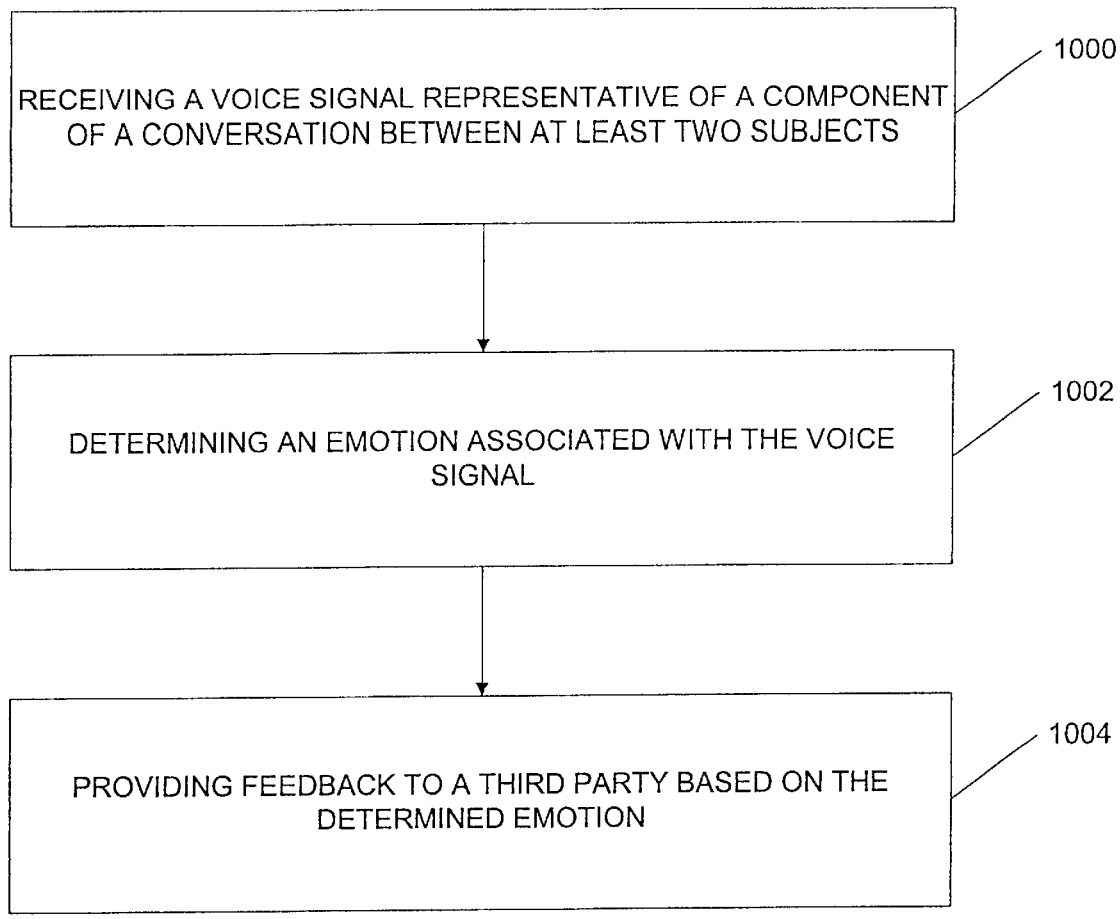
FIG. 10 is a flow diagram that illustrates one embodiment of the present invention that monitors emotions in voice signals and provides feedback based on the detected emotions.

FIG. 10 illustrates one embodiment of the present invention that monitors emotions in voice signals and provides operator feedback based on the detected emotions. First, a voice signal representative of a component of a conversation between at least two subjects is received in operation 1000. In operation 1002, an emotion associated with the voice signal is determined. Finally, in operation 1004, feedback is provided to a third party based on the determined emotion.

The conversation may be carried out over a telecommunications network, as well as a wide area network such as the internet when used with internet telephony. As an option, the emotions are screened and feedback is provided only if the emotion is determined to be a negative emotion selected from the group of negative emotions consisting of anger, sadness, and fear. The same could be done with positive or neutral emotion groups. The emotion may be determined by extracting a feature from the voice signal, as previously described in detail.

The present invention is particularly suited to operation in conjunction with an emergency response system, such as the 911 system. In such system, incoming calls could be monitored by the present invention. An emotion of the caller would be determined during the caller's conversation with the technician who answered the call. The emotion could then be sent via radio waves, for example, to the emergency response team, i.e., police, fire, and/or ambulance personnel, so that they are aware of the emotional state of the caller.

In another scenario, one of the subjects is a customer, another of the subjects is an employee such as one employed by a call center or customer service department, and the third party is a manager. The present invention would monitor the conversation between the customer and the employee to determine whether the customer and/or the employee are becoming upset, for example. When negative emotions are detected, feedback is sent to the manager, who can assess the situation and intervene if necessary.

Improving Emotion Recognition

Figure 11:
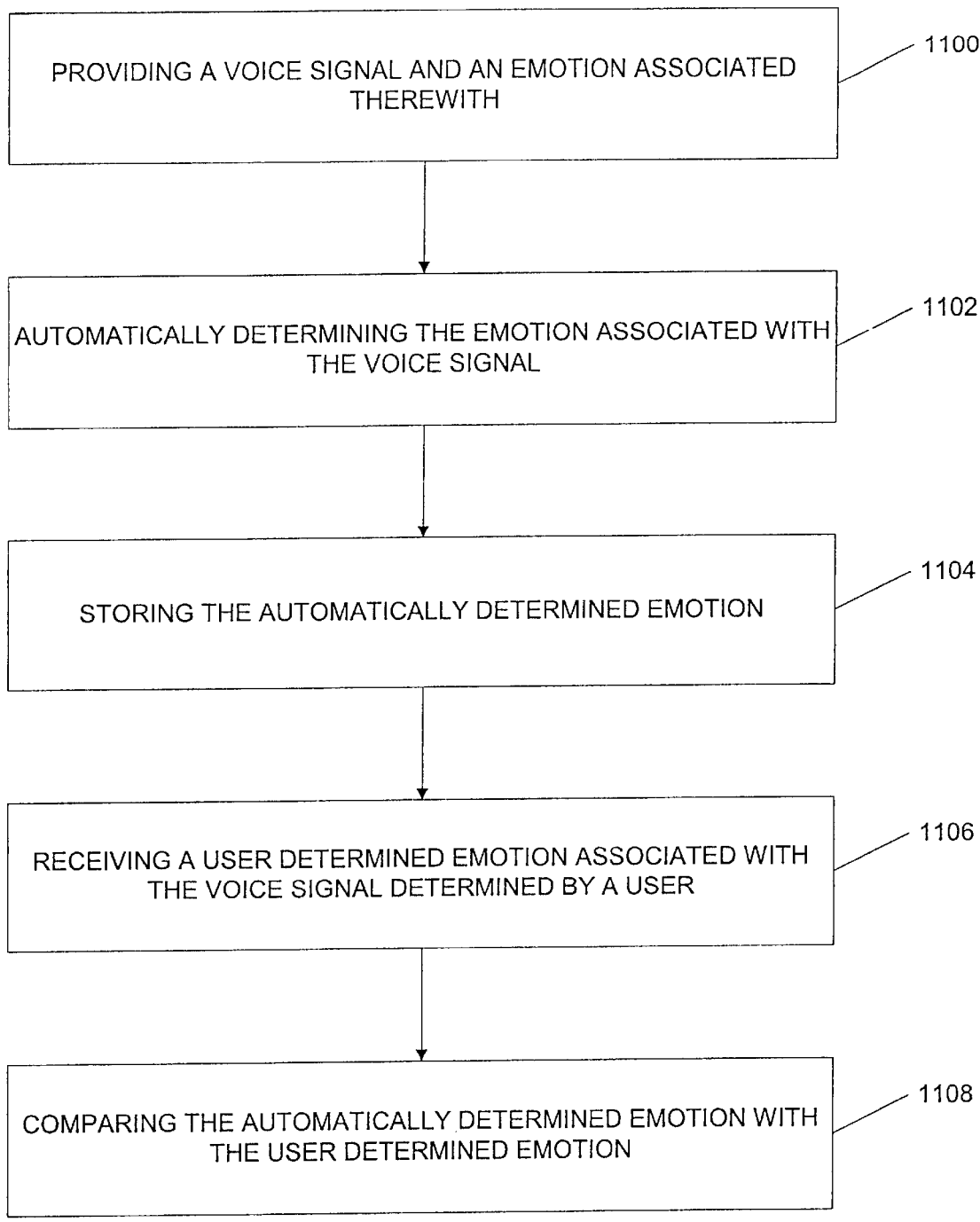
FIG. 11 is a flow chart illustrating an embodiment of the present invention that compares user vs. computer emotion detection of voice signals to improve emotion recognition of either the invention, a user, or both.

FIG. 11 illustrates an embodiment of the present invention that compares user vs. computer emotion detection of voice signals to improve emotion recognition of either the invention, a user, or both. First, in operation 1100, a voice signal and an emotion associated with the voice signal are provided. The emotion associated with the voice signal is automatically determined in operation 1102 in a manner set forth above. The automatically determined emotion is stored in operation 1104, such as on a computer readable medium. In operation 1106, a user-determined emotion associated with the voice signal determined by a user is received. The automatically determined emotion is compared with the user determined emotion in operation 1108.

The voice signal may be emitted from or received by the present invention. Optionally, the emotion associated with the voice signal is identified upon the emotion being provided. In such case, it should be determined whether the automatically determined emotion or the user-determined emotion matches the identified emotion. The user may be awarded a prize upon the user-determined emotion matching the identified emotion. Further, the emotion may be automatically determined by extracting at least one feature from the voice signals, such as in a manner discussed above.

To assist a user in recognizing emotion, an emotion recognition game can be played in accordance with one embodiment of the present invention. The game could allow a user to compete against the computer or another person to see who can best recognize emotion in recorded speech. One practical application of the game is to help autistic people in developing better emotional skills at recognizing emotion in speech.

In accordance with one embodiment of the present invention, an apparatus may be used to create data about voice signals that can be used to improve emotion recognition. In such an embodiment, the apparatus accepts vocal sound through a transducer such as a microphone or sound recorder. The physical sound wave, having been transduced into electrical signals are applied in parallel to a typical, commercially available bank of electronic filters covering the audio frequency range. Setting the center frequency of the lowest filter to any value that passes the electrical energy representation of the vocal signal amplitude that includes the lowest vocal frequency signal establishes the center values of all subsequent filters up to the last one passing the energy-generally between 8 kHz to 16 kHz or between 10 kHz and 20 kHz, and also determine the exact number of such filters. The specific value of the first filter's center frequency is not significant, so long as the lowest tones of the human voice is captured, approximately 70 Hz. Essentially any commercially available bank is applicable if it can be interfaced to any commercially available digitizer and then microcomputer. The specification section describes a specific set of center frequencies and microprocessor in the preferred embodiment. The filter quality is also not particularly significant because a refinement algorithm disclosed in the specification brings any average quality set of filters into acceptable frequency and amplitude values. The ratio 1/3, of course, defines the band width of all the filters once the center frequencies are calculated.

Following this segmentation process with filters, the filter output voltages are digitized by a commercially available set of digitizers or preferably multiplexer and digitizer, on in the case of the disclosed preferred embodiment, a digitizer built into the same identified commercially available filter bank, to eliminate interfacing logic and hardware. Again quality of digitizer in terms of speed of conversion or discrimination is not significant because average presently available commercial units exceed the requirements needed here, due to a correcting algorithm (see specifications) and the low sample rate necessary.

Any complex sound that is carrying constantly changing information can be approximated with a reduction of bits of information by capturing the frequency and amplitude of peaks of the signal. This, of course, is old knowledge, as is performing such an operation on speech signals. However, in speech research, several specific regions where such peaks often occur have been labeled "formant" regions. However, these region approximations do not always coincide with each speaker's peaks under all circumstances. Speech researchers and the prior inventive art, tend to go to great effort to measure and name "legitimate" peaks as those that fall within the typical formant frequency regions, as if their definition did not involve estimates, but rather absoluteness. This has caused numerous research and formant measuring devices to artificially exclude pertinent peaks needed to adequately represent a complex, highly variable sound wave in real time. Since the present disclosure is designed to be suitable for animal vocal sounds as well as all human languages, artificial restrictions such as formants, are not of interest and the sound wave is treated as a complex, varying sound wave which can analyze any such sound.

In order to normalize and simplify peak identification, regardless of variation in filter band width, quality and digitizer discrimination, the actual values stored for amplitude and frequency are "representative values". This is so that the broadness of upper frequency filters is numerically similar to lower frequency filter band width. Each filter is simply given consecutive values from 1 to 25, and a soft to loud sound is scaled from 1 to 40, for ease of CRT screen display. A correction on the frequency representation values is accomplished by adjusting the number of the filter to a higher decimal value toward the next integer value, if the filter output to the right of the peak filter has a greater amplitude than the filter output on the left of the peak filter. The details of a preferred embodiment of this algorithm is described in the specifications of this disclosure. This correction process must occur prior to the compression process, while all filter amplitude values are available.

Rather than slowing down the sampling rate, the preferred embodiment stores all filter amplitude values for 10 to 15 samples per second for an approximate 10 to 15 second speech sample before this correction and compression process. If computer memory space is more critical than sweep speed, the corrections and compression should occur between each sweep eliminating the need for a large data storage memory. Since most common commercially available, averaged price mini-computers have sufficient memory, the preferred and herein disclosed embodiment saves all data and afterwards processes the data.

Most vocal animal signals of interest including human contain one largest amplitude peak not likely on either end of the frequency domain. This peak can be determined by any simple and common numerical sorting algorithm as is done in this invention. The amplitude and frequency representative values are then placed in the number three of six memory location sets for holding the amplitudes and frequencies of six peaks.

The highest frequency peak above 8 k Hz is placed in memory location number six and labeled high frequency peak. The lowest peak is placed in the first set of memory locations. The other three are chosen from peaks between these. Following this compression function, the vocal signal is represented by an amplitude and frequency representative value from each of six peaks, plus a total energy amplitude from the total signal unfiltered for, say, ten times per second, for a ten second sample. This provides a total of 1300 values.

The algorithms allow for variations in sample length in case the operator overrides the sample length switch with the override off-switch to prevent continuation during an unexpected noise interruption. The algorithms do this by using averages not significantly sensitive to changes in sample number beyond four or five seconds of sound signal. The reason for a larger speech sample, if possible, is to capture the speaker's average "style" of speech, typically evident within 10 to 15 seconds.

The output of this compression function is fed to the element assembly and storage algorithm which assembles (a) four voice quality elements to be described below; (b) a sound "pause" or on-to-off ratio; (c) "variability"—the difference between each peak's amplitude for the present sweep and that of the last sweep; differences between each peak's frequency number for the present sweep and that of the last sweep; and difference between the total unfiltered energy of the present sweep and that of the last sweep; (d) a "syllable change approximation" by obtaining the ratio of times that the second peak changes greater than 0.4 between sweeps to the total number of sweeps with sound; and (e) "high frequency analysis"—the ratio of the number of sound-on sweeps that contain a non-zero value in this peak for the number six peak amplitude. This is a total of 20 elements available per sweep. These are then passed to the style dimension assembly algorithm.

The four voice quality elements are (1) The "spread"—the sample mean of all the sweeps' differences between their average of the frequency representative values above the maximum amplitude peak and the average of those below, (2) The "balance"—the sample means of all the sweeps' average amplitude values of peaks 4,5 & 6 divided by the average of peaks 1 & 2. (3) "envelope flatness high"—the sample mean of all the sweeps' averages of their amplitudes above the largest peak divided by the largest peak, (4) "envelope flatness low"—the sample mean of all the sweeps' averages of their amplitudes below the largest peak divided by the largest peak.

The voice-style dimensions are labeled "resonance" and "quality", and are assembled by an algorithm involving a coefficient matrix operating on selected elements.

The "speech-style" dimensions are labeled "variability-monotone", "choppy-smooth", "staccato-sustain", "attacksoft", "affectivity-control". These five dimensions, with names pertaining to each end of each dimension, are measured and assembled by an algorithm involving a coefficient matrix operating on 15 of the 20 sound elements, detailed in Table 6 and the specification section.

The perceptual-style dimensions are labeled "eco-structure", "invariant sensitivity", "other-self", "sensory-internal", "hate-love", "independence-dependency" and "emotional-physical". These seven perceptual dimensions with names relating to the end areas of the dimensions, are measured and assembled by an algorithm involving a coefficient matrix and operating on selected sound elements of voice and speech (detailed in Table 7) and the specification section.

A commercially available, typical computer keyboard or keypad allows the user of the present disclosure to alter any and all coefficients for redefinition of any assembled speech, voice or perceptual dimension for research purposes. Selection switches allow any or all element or dimension values to be displayed for a given subject's vocal sample. The digital processor controls the analog-to-digital conversion of the sound signal and also controls the reassembly of the vocal sound elements into numerical values of the voice and speech, perceptual dimensions.

The microcomputer also coordinates the keypad inputs of the operator and the selected output display of values, and coefficient matrix choice to interact with the algorithms assembling the voice, speech and perceptual dimensions. The output selection switch simply directs the output to any or all output jacks suitable for feeding the signal to typical commercially available monitors, modems, printers or by default to a light-emitting, on-board readout array.

By evolving group profile standards using this invention, a researcher can list findings in publications by occupations, dysfunctions, tasks, hobby interests, cultures, languages, sex, age, animal species, etc. Or, the user may compare his/her values to those published by others or to those built into the machine.

Figure 12:
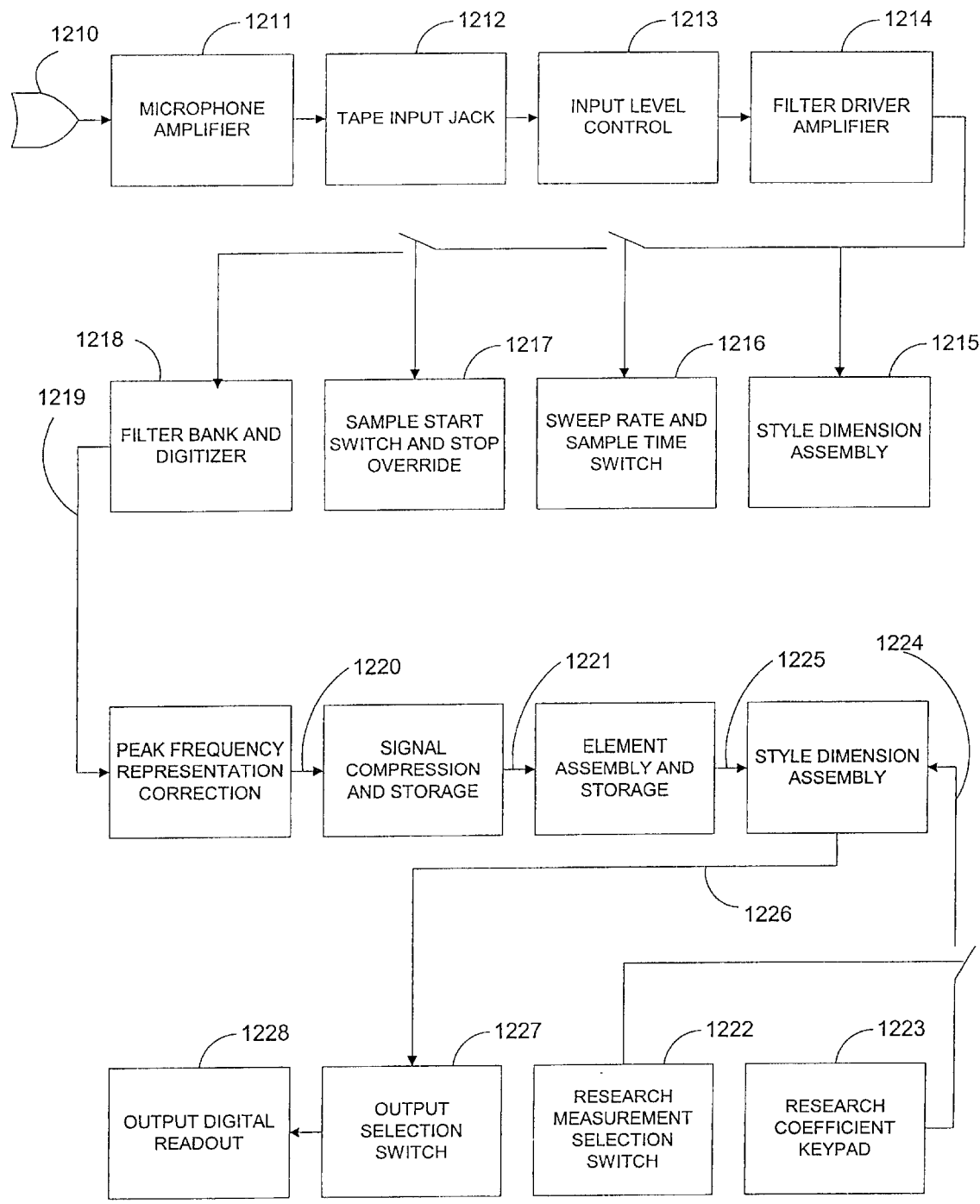
FIG. 12 is a schematic diagram in block form of a speech recognition apparatus in accordance with one embodiment of the invention.

Referring now to FIG. 12 of the drawings, a vocal utterance is introduced into the vocal sound analyzer through a microphone 1210, and through a microphone amplifier 1211 for signal amplification, or from taped input through tape input jack 1212 for use of a pre-recorded vocal utterance input. An input level control 1213 adjusts the vocal signal level to the filter driver amplifier 1214. The filter driver amplifier 1214 amplifies the signal and applies the signal to V.U. meter 1215 for measuring the correct operating signal level.

The sweep rate per second and the number of sweeps per sample is controlled by the operator with the sweep rate and sample time switch 1216. The operator starts sampling with the sample start switch and stop override 1217. The override feature allows the operator to manually override the set sampling time, and stop sampling, to prevent contaminating a sample with unexpected sound interference, including simultaneous speakers. This switch also, connects and disconnects the microprocessors power supply to standard 110 volt electrical input prongs.

The output of the filter driver amplifier 1214 is also applied to a commercially available microprocessor-controlled filter bank and digitizer 1218, which segments the electrical signal into 1/3 octave regions over the audio frequency range for the organism being sampled and digitizes the voltage output of each filter. In a specific working embodiment of the invention, 25⅓ octave filters of an Eventide spectrum analyzer with filter center frequencies ranging from 63 HZ to 16,000 HZ. Also utilized was an AKAI microphone and tape recorder with built in amplifier as the input into the filter bank and digitizer 1218. The number of sweeps per second that the filter bank utilizes is approximately ten sweeps per second. Other microprocessor-controlled filter banks and digitizers may operate at different speeds.

Any one of several commercially available microprocessors is suitable to control the aforementioned filter bank and digitizer.

As with any complex sound, amplitude across the audio frequency range for a "time slice" 0.1 of a second will not be constant or flat, rather there will be peaks and valleys. The frequency representative values of the peaks of this signal, 1219, are made more accurate by noting the amplitude values on each side of the peaks and adjusting the peak values toward the adjacent filter value having the greater amplitude. This is done because, as is characteristic of adjacent 1/3 octave filters, energy at a given frequency spills over into adjacent filters to some extent, depending on the cut-off qualities of the filters. In order to minimize this effect, the frequency of a peak filter is assumed to be the center frequency only if the two adjacent filters have amplitudes within 10% of their average. To guarantee discreet, equally spaced, small values for linearizing and normalizing the values representing the unequal frequency intervals, each of the 25 filters are given number values 1 through 25 and these numbers are used throughout the remainder of the processing. This way the 3,500 HZ difference between filters 24 and 25 becomes a value of 1, which in turn is also equal to the 17 HZ difference between the first and second filter.

To prevent more than five sub-divisions of each filter number and to continue to maintain equal valued steps between each sub-division of the 1 to 25 filter numbers, they are divided into 0.2 steps and are further assigned as follows. If the amplitude difference of the two adjacent filters to a peak filter is greater than 30% of their average, then the peak filter's number is assumed to be nearer to the half-way point to the next filter number than it is of the peak filter. This would cause the filter number of a peak filter, say filter number 6.0, to be increased to 6.4 or decreased to 5.6, if the bigger adjacent filter represents a higher, or lower frequency, respectively. AU other filter values, of peak filters, are automatically given the value of its filter number +0.2 and −0.2 if the greater of the adjacent filter amplitudes represents a higher or lower frequency respectively.

The segmented and digitally represented vocal utterance signal 1219, after the aforementioned frequency correction 1220, is compressed to save memory storage by discarding all but six amplitude peaks. The inventor found that six peaks were sufficient to capture the style characteristics, so long as the following characteristics are observed. At least one peak is near the fundamental frequency; exactly one peak is allowed between the region of the fundamental frequency and the peak amplitude frequency, where the nearest one to the maximum peak is preserved; and the first two peaks above the maximum peak is saved plus the peak nearest the 16,000 HZ end or the 25th filter if above 8 kHz, for a total of six peaks saved and stored in microprocessor memory. This will guarantee that the maximum peak always is the third peak stored in memory and that the sixth peak stored can be used for high frequency analysis, and that the first one is the lowest and nearest to the fundamental.

Following the compression of the signal to include one full band amplitude value, the filter number and amplitude value of six peaks, and each of these thirteen values for 10 samples for a 10 second sample, (1300 values), 1221 of FIG. 12, sound element assembly begins.

To arrive at voice style "quality" elements, this invention utilizes relationships between the lower set and higher set of frequencies in the vocal utterance. The speech style elements, on the other hand, is determined by a combination of measurements relating to the pattern of vocal energy occurrences such as pauses and decay rates. These voice style "quality" elements emerge from spectrum analysis FIG. 13, 1330, 1331, and 1332. The speech style elements emerge from the other four analysis functions as shown in FIG. 13, 1333, 1334, 1335, and 1336 and Table 6.

The voice style quality analysis elements stored are named and derived as: (1) the spectrum "spread"—the sample mean of the distance in filter numbers between the average of the peak filter numbers above, and the average of the peak filter numbers below the maximum peak, for each sweep, FIG. 13, 1330; (2) the spectrum's energy "balance"—the mean for a sample of all the sweep's ratios of the sum of the amplitudes of those peaks above to the sum of the amplitudes below the maximum peak, 1331; (3) the spectrum envelope "flatness"—the arithmetic means for each of two sets of ratios for each sample—the ratios of the average amplitude of those peaks above (high) to the maximum peak, and of those below (low) the maximum peak to the maximum peak, for each sweep, 1332.

The speech style elements, that are stored, are named and derived respectively: (1) spectrum variability—the six means, of an utterance sample, of the numerical differences between each peak's filter number, on one sweep, to each corresponding peak's filter number on the next sweep, and also the six amplitude value differences for these six peaks and also including the full spectrum amplitude differences for each sweep, producing a sample total of 13 means, 1333; (2) utterance pause ratio analysis—the ratio of the number of sweeps in the sample that the full energy amplitude values were pauses (below two units of amplitude value) to the number that had sound energy (greater than one unit of value), 1334; (3) syllable change approximation—the ratio of the number of sweeps that the third peak changed number value greater than 0.4 to the number of sweeps having sound during the sample, 1335; (4) and, high frequency analysis— the ratio of the number of sweeps for the sample that the sixth peak had an amplitude value to the total number of sweeps, 1336.

As set forth above, the speech-style dimensions are divided into five dimensions in the method and apparatus of this invention, which are depicted in Table 6. These were determined to be the most sensitive to an associated set of seven perceptual style dimensions, which are listed in Table 7.

Figure 13:
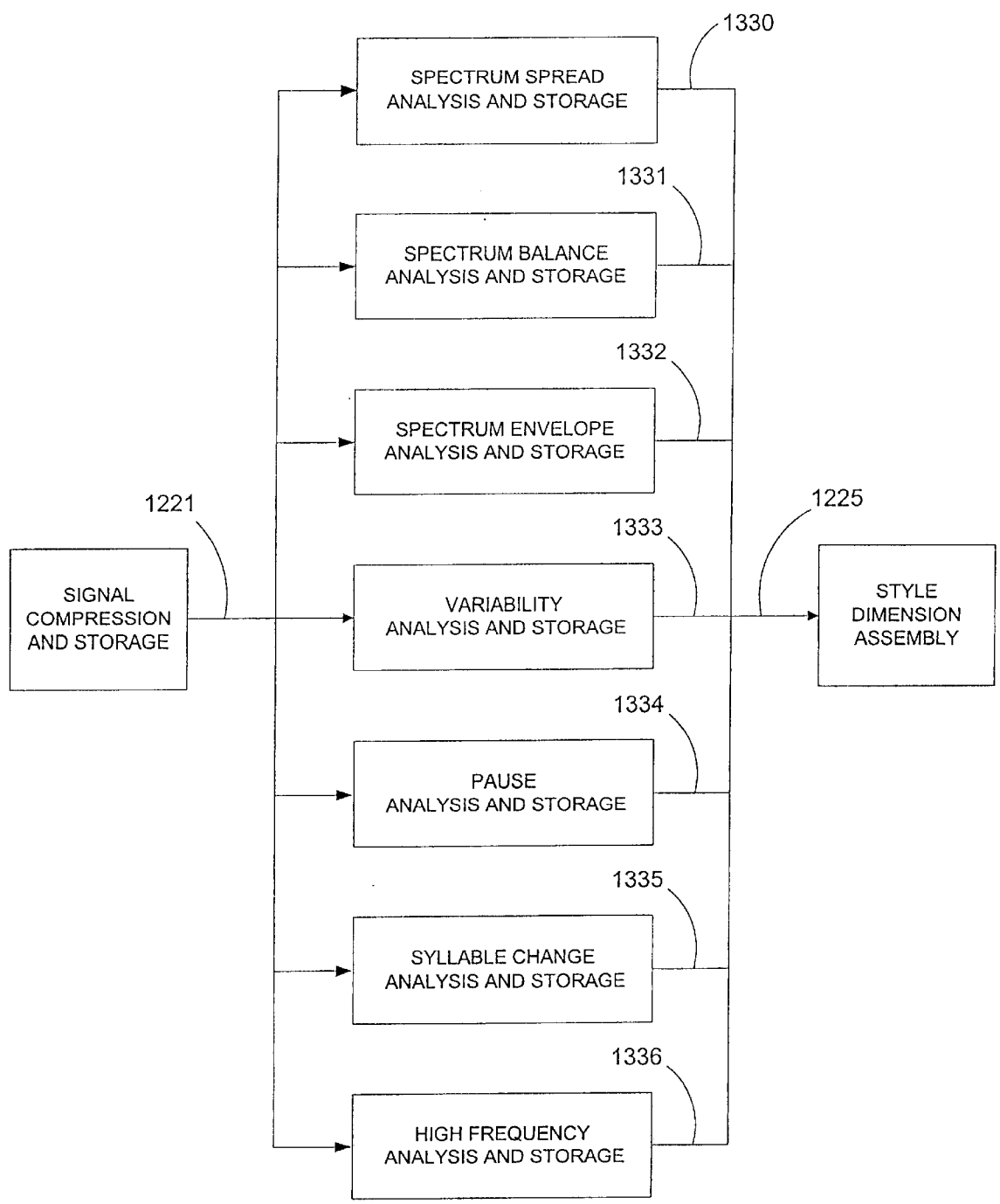
FIG. 13 is a schematic diagram in block form of the element assembly and storage block in FIG. 12.

The procedure for relating the sound style elements to the voice, speech, and perceptual dimensions for output, FIG. 12, 1228, is through equations that determine each dimension as a function of selected sound style elements, FIG. 13, 1330, through 1336. Table 6 relates the speech style elements, 1333 through 1336 of FIG. 13, to the speech style dimensions.

Table 7, depicts the relationship between seven perceptual style dimensions and the sound style elements, 1330 through 1336. Again, the purpose of having an optional input coefficient array containing zeros is to allow the apparatus operator to switch or key in changes in these coefficients for research purposes, 1222, 1223. The astute operator can develop different perceptual dimensions or even personality or cognitive dimensions, or factors, (if he prefers this terminology) which require different coefficients altogether. This is done by keying in the desired set of coefficients and noting which dimension (1226) that he is relating these to.

For instance, the other-self dimension of Table 7 may not be a wanted dimension by a researcher who would like to replace it with a user perceptual dimension that he names introvert-extrovert. By replacing the coefficient set for the other-self set, by trial sets, until an acceptably high correlation exists between the elected combination of weighted sound style elements and his externally determined introvert-extrovert dimension, the researcher can thusly use that slot for the new introvert-extrovert dimension, effectively renaming it. This can be done to the extent that the set of sound elements of this invention are sensitive to a user dimension of introvert-extrovert, and the researcher's coefficient set reflects the appropriate relationship. This will be possible with a great many user determined dimensions to a useful degree, thereby enabling this invention to function productively in a research environment where new perceptual dimensions, related to sound style elements, are being explored, developed, or validated.

TABLE 6

Speech Style Dimensions' (DSj)(1) Coefficients Elements (Differences)

| ESi(2) | CSi1 | CSi2 | CSi3 | CSi4 | CSi5 |
|---|---|---|---|---|---|
| No.-1 | 0 | 0 | 0 | 0 | 0 |
| Amp-1 | 0 | 0 | 0 | 0 | 0 |
| No.-2 | 1 | 0 | 0 | 0 | 1 |
| Amp-2 | 1 | 0 | 0 | 1 | 0 |
| No.-3 | 0 | 0 | 0 | 0 | 0 |
| Amp-3 | 0 | 0 | 0 | 0 | 0 |
| No.-4 | 0 | 0 | 0 | 0 | 0 |
| Amp-4 | 0 | 0 | 0 | 0 | 0 |
| No.-5 | 0 | 0 | 0 | 0 | 1 |
| Amp-5 | 0 | 0 | 1 | 0 | 0 |
| No.-6 | 0 | 0 | 0 | 0 | 0 |
| Amp-6 | 0 | 0 | 0 | 0 | 0 |
| Amp-7 | 0 | 1 | 1 | 0 | −1 |
| Pause | 0 | 1 | 1 | 0 | 0 |
| Peak 6 | 0 | 0 | −1 | −1 | 1 |

STR1##
DS1 = VariabilityMonotone
DS2 = ChoppySmooth
DS3 = StaccatoSustain
DS4 = AttackSoft
DS5 = AffectivityControl.
(2)No. 1 through 6 = Peak Filter Differences 1–6, and Ampl through 6 = Peak Amplitude Differences 1–6.
Amp7 = Full Band Pass amplitude Differences.

TABLE 7

Perceptual Style Dimension's (DPj)(1) Coefficients Elements Differences

| EPi | CPi1 | CPi2 | CPi3 | CPi4 | CPi5 | CPi6 | CPi7 |
|---|---|---|---|---|---|---|---|
| Spread | 0 | 0 | 0 | 0 | 0 | 0 | 0 |
| Balance | 1 | 1 | 0 | 0 | 0 | 0 | 0 |
| Env-H | 0 | 1 | 0 | 0 | 0 | 0 | 0 |
| Env-L | 1 | 0 | 0 | 0 | 0 | 0 | 0 |
| No.-1 | 0 | 0 | 0 | 0 | 0 | 0 | 0 |
| Amp-1 | 0 | 0 | 0 | 0 | 0 | 0 | 0 |
| No.-2 | 0 | 0 | 1 | 0 | 0 | 0 | 1 |
| Amp-2 | 0 | 0 | 1 | 0 | 0 | 1 | 0 |
| No.-3 | 0 | 0 | 0 | 0 | 0 | 0 | 0 |
| Amp-3 | 0 | 0 | 0 | 0 | 0 | 0 | 0 |
| No.-4 | 0 | 0 | 0 | 0 | 0 | 0 | 0 |
| Amp-4 | 0 | 0 | 0 | 0 | 0 | 0 | 0 |
| No.-5 | 0 | 0 | 0 | 0 | 0 | 0 | 1 |

TABLE 7-continued

Perceptual Style
Dimension's (DPj)(1) Coefficients
Elements
Differences

| EPi | CPi1 | CPi2 | CPi3 | CPi4 | CPi5 | CPi6 | CPi7 |
|---|---|---|---|---|---|---|---|
| Amp-5 | 0 | 0 | 0 | 0 | −1 | 0 | 0 |
| No.-6 | 0 | 0 | 0 | 0 | 0 | 0 | 0 |
| Amp-6 | 0 | 0 | 0 | 0 | 0 | 0 | 0 |
| Amp-7 | 0 | 0 | 0 | 1 | 1 | 0 | −1 |
| Pause | 0 | 0 | 0 | 1 | 1 | 0 | 0 |
| Peak 6 | 0 | 0 | 0 | 0 | −1 | −1 | 1 |

STR2##
DP1 = EcoStructure High-Low;
DP2 = Invariant Sensitivity High-Low;
DP3 = Other-Self;
DP4 = Sensory-Internal;
DP5 = Hate-Love;
DP6 Dependency-Independency;
DP7 = Emotional-Physical.
(2)No. 1 through 6 = Peak Filter Differences 1–6; Amp1 Through 6 = Peak amplitude Differences 1–6; and Amp7 Full band pass amplitude differences.

The primary results available to the user of this invention is the dimension values, 1226, available selectively by a switch, 1227, to be displayed on a standard light display, and also selectively for monitor, printer, modem, or other standard output devices, 1228. These can be used to determine how close the subject's voice is on any or all of the sound or perceptual dimensions from the built-in or published or personally developed controls or standards, which can then be used to assist in improving emotion recognition.

In another exemplary embodiment of the present invention, bio-signals received from a user are used to help determine emotions in the user's speech. The recognition rate of a speech recognition system is improved by compensating for changes in the user's speech that result from factors such as emotion, anxiety or fatigue. A speech signal derived from a user's utterance is modified by a preprocessor and provided to a speech recognition system to improve the recognition rate. The speech signal is modified based on a bio-signal which is indicative of the user's emotional state.

Figure 14:
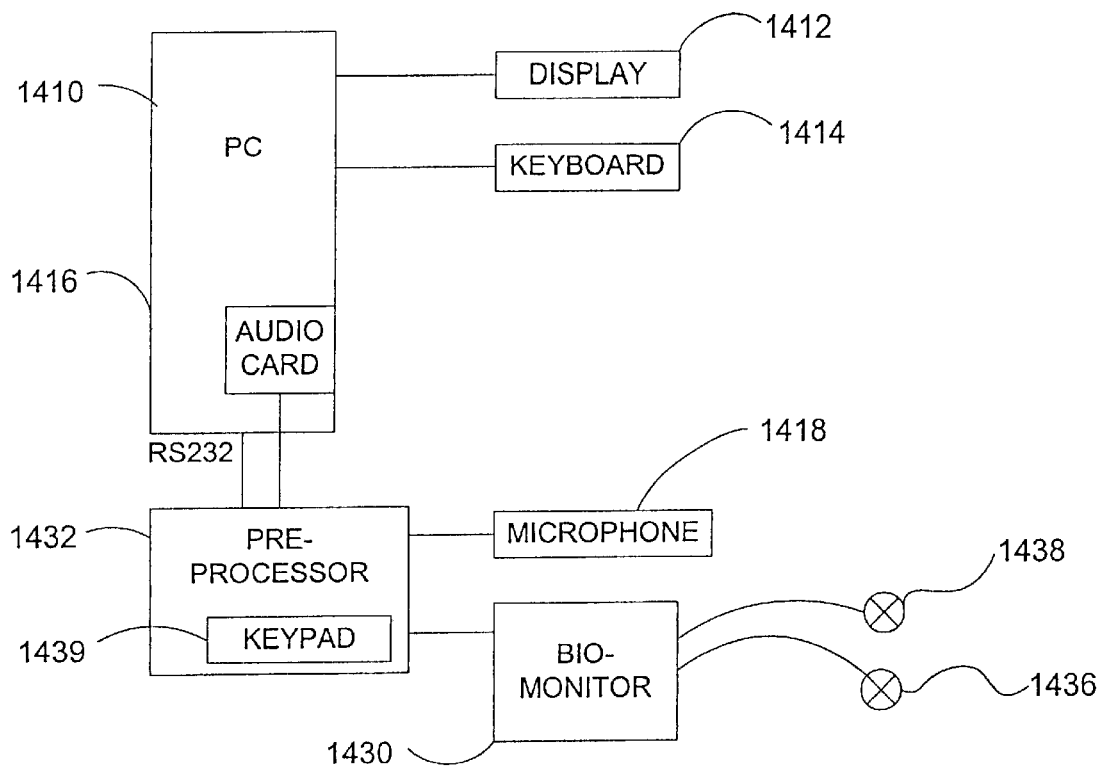
FIG. 14 illustrates a speech recognition system with a bio-monitor and a preprocessor in accordance with one embodiment of the present invention.

In more detail, FIG. 14 illustrates a speech recognition system where speech signals from microphone 1418 and bio-signals from bio-monitor 1430 are received by preprocessor 1432. The signal from bio-monitor 1430 to preprocessor 1432 is a bio-signal that is indicative of the impedance between two points on the surface of a user's skin. Bio-monitor 1430 measures the impedance using contact 1436 which is attached to one of the user's fingers and contact 1438 which is attached to another of the user's fingers. A bio-monitor such as a bio-feedback monitor sold by Radio Shack, which is a division of Tandy Corporation, under the trade name (MICRONATA.RTM. BIOFEEDBACK MONITOR) model number 63–664 may be used. It is also possible to attach the contacts to other positions on the user's skin. When user becomes excited or anxious, the impedance between points 1436 and 1438 decreases and the decrease is detected by monitor 1430 which produces a bio-signal indicative of a decreased impedance. Preprocessor 1432 uses the bio-signal from bio-monitor 1430 to modify the speech signal received from microphone 1418, the speech signal is modified to compensate for the changes in user's speech due to changes resulting from factors such as fatigue or a change in emotional state. For example, preprocessor 1432 may lower the pitch of the speech signal from microphone 1418 when the bio-signal from bio-monitor 1430 indicates that user is in an excited state, and preprocessor 1432 may increase the pitch of the speech signal from microphone 1418 when the bio-signal from bio-monitor 1430 indicates that the user is in a less excited state such as when fatigued. Preprocessor 1432 then provides the modified speech signal to audio card 1416 in a conventional fashion. For purposes such as initialization or calibration, preprocessor 1432 may communicate with PC 1410 using an interface such as an RS232 interface. User 1434 may communicate with preprocessor 1432 by observing display 1412 and by entering commands using keyboard 1414 or keypad 1439 or a mouse.

It is also possible to use the bio-signal to preprocess the speech signal by controlling the gain and/or frequency response of microphone 1418. The microphone's gain or amplification may be increased or decreased in response to the bio-signal. The bio-signal may also be used to change the frequency response of the microphone. For example, if microphone 1418 is a model ATM71 available from AUDIO-TECHNICA U.S., Inc., the bio-signal may be used to switch between a relatively flat response and a rolled-off response, where the rolled-off response provided less gain to low frequency speech signals.

Figure 15:
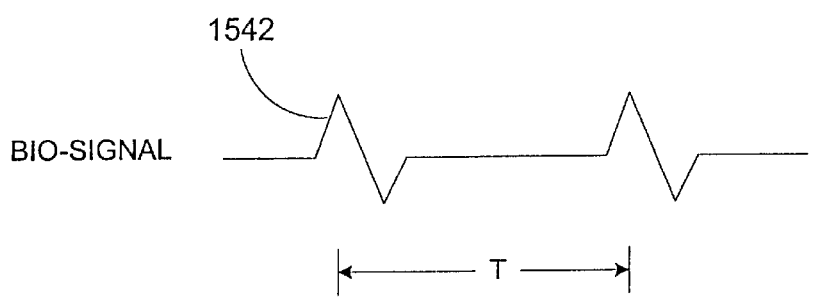
FIG. 15 illustrates a bio-signal produced by the bio-monitor of FIG. 14.

When bio-monitor 1430 is the above-referenced monitor available from Radio Shack, the bio-signal is in the form of a series of ramp-like signals, where each ramp is approximately 0.2 m sec. in duration. FIG. 15 illustrates the bio-signal, where a series of ramp-like signals 1542 are separated by a time T. The amount of time T between ramps 1542 relates to the impedance between points 1438 and 1436. When the user is in a more excited state, the impedance between points 1438 and 1436 is decreased and time T is decreased. When the user is in a less excited state, the impedance between points 1438 and 1436 is increased and the time T is increased.

The form of a bio-signal from a bio-monitor can be in forms other than a series of ramp-like signals. For example, the bio-signal can be an analog signal that varies in periodicity, amplitude and/or frequency based on measurements made by the bio-monitor, or it can be a digital value based on conditions measured by the bio-monitor.

Figure 16:
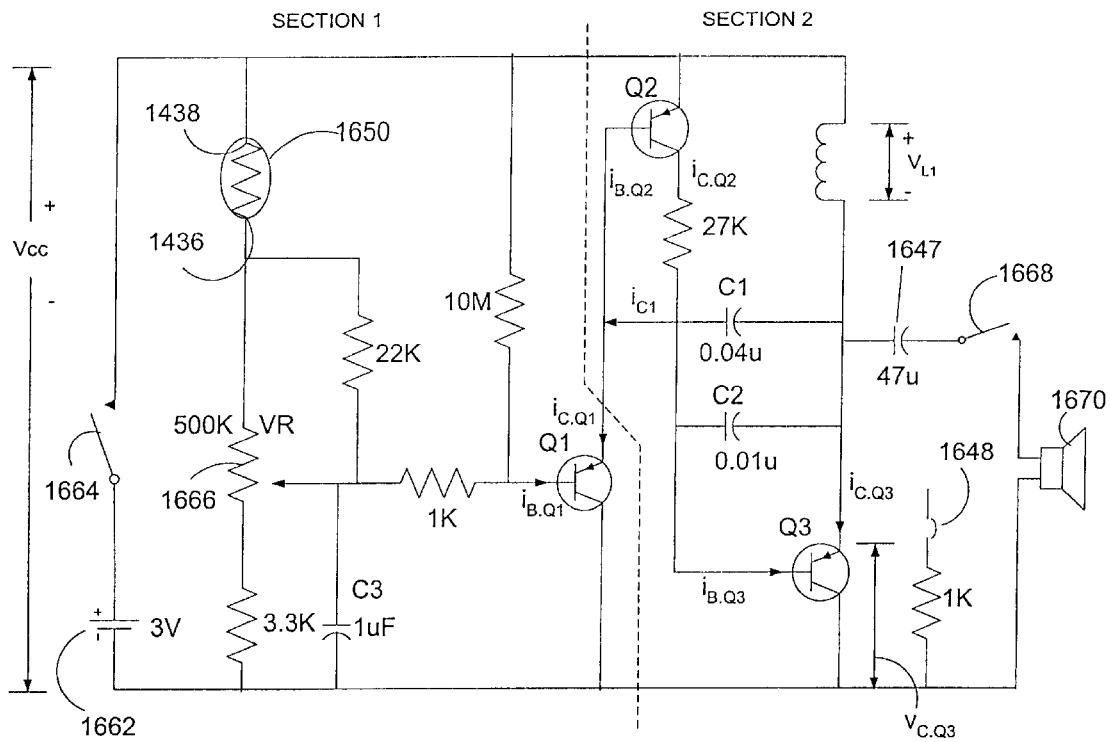
FIG. 16 illustrates a circuit within the bio-monitor.

Bio-monitor 1430 contains the circuit of FIG. 16 which produces the bio-signal that indicates the impedance between points 1438 and 1436. The circuit consists of two sections. The first section is used to sense the impedance between contacts 1438 and 1436, and the second section acts as an oscillator to produce a series of ramp signals at output connector 1648, where the frequency of oscillation is controlled by the first section.

The first section controls the collector current $I_{c,Q1}$ and voltage $V_{c,Q1}$ of transistor Q1 based on the impedance between contacts 1438 and 1436. In this embodiment, impedance sensor 1650 is simply contacts 1438 and 1436 positioned on the speaker's skin. Since the impedance between contacts 1438 and 1436 changes relatively slowly in comparison to the oscillation frequency of section 2, the collector current $I_{c,Q1}$ and voltage $V_{c,Q1}$ are virtually constant as far as section 2 is concerned. The capacitor C3 further stabilizes these currents and voltages.

Section 2 acts as an oscillator. The reactive components, L1 and C1, turn transistor Q3 on and off to produce an oscillation. When the power is first turned on, $I_{c,Q1}$ turns on Q2 by drawing base current $I_{b,Q2}$. Similarly, $I_{c,Q2}$ turns on transistor Q3 by providing base current $I_{b,Q3}$. Initially there is no current through inductor L1. When Q3 is turned on, the voltage Vcc less a small saturated transistor voltage $V_{c,Q3}$, is applied across L1. As a result, the current $I_{L1}$ increases in accordance with $$L\frac{dI_{LI}}{dt} = V_{LI}$$

As current $I_{L1}$ increases, current $I_{c1}$ through capacitor C1 increases. Increasing the current $I_{c1}$ reduces the base current $I_{B,Q2}$ from transistor Q2 because current $I_{c,Q1}$ is virtually constant. This in turn reduces currents $I_{c,Q2}$, $I_{c,Q3}$ and $I_{c,Q3}$. As a result, more of current $I_{L1}$ passes through capacitor C1 and further reduces current $I_{c,Q3}$. This feedback causes transistor Q3 to be turned off. Eventually, capacitor C1 is fully charged and currents $I_{L1}$ and $L_{c1}$ drop to zero, and thereby permit current $I_{c,Q1}$ to once again draw base current $I_{b,Q2}$ and turn on transistors Q2 and Q3 which restarts the oscillation cycle.

Current $I_{c,Q1}$, which depends on the impedance between contacts 1438 and 1436, controls the frequency on duty cycle of the output signal. As the impedance between points 1438 and 1436 decreases, the time T between ramp signals decreases, and as the impedance between points 1438 and 1436 increases, the time T between ramp signals increases.

The circuit is powered by three-volt battery source 1662 which is connected to the circuit via switch 1664. Also included is variable resistor 1666 which is used to set an operating point for the circuit. It is desirable to set variable resistor 1666 at a position that is approximately in the middle of its range of adjustability. The circuit then varies from this operating point as described earlier based on the impedance between points 1438 and 1436. The circuit also includes switch 1668 and speaker 1670. When a mating connector is not inserted into connector 1648, switch 1668 provides the circuit's output to speaker 1670 rather than connector 1648.

Figure 17:
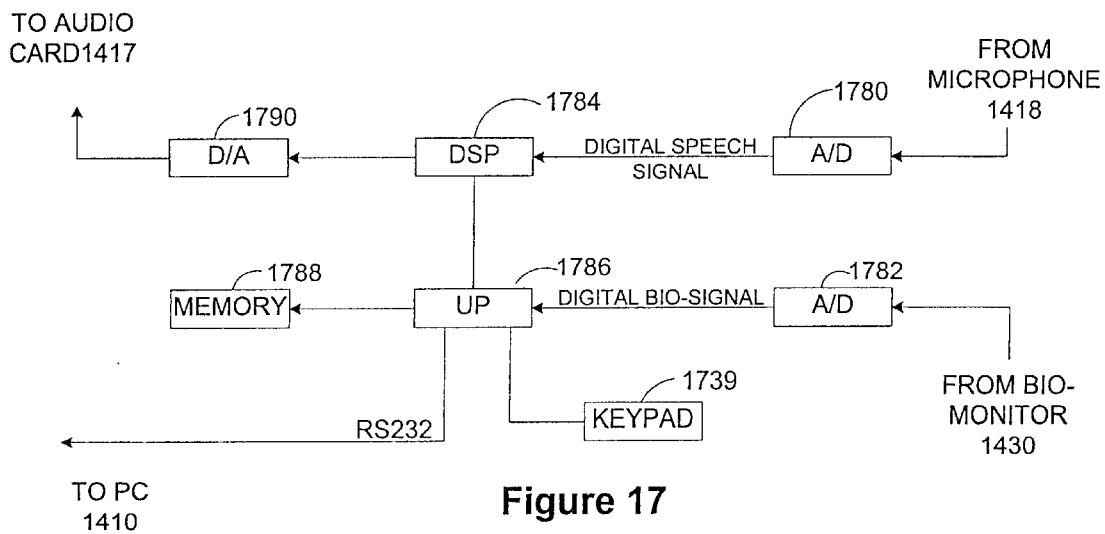
FIG. 17 is a block diagram of the preprocessor.

FIG. 17 is a block diagram of preprocessor 1432. Analog-to-digital (A/D) converter 1780 receives a speech or utterance signal from microphone 1418, and analog-to-digital (A/D) converter 1782 receives a bio-signal from bio-monitor 1430. The signal from A/D 1782 is provided to microprocessor 1784. Microprocessor 1784 monitors the signal from A/D 1782 to determine what action should be taken by digital signal processor (DSP) device 1786. Microprocessor 1784 uses memory 1788 for program storage and for scratch pad operations. Microprocessor 1784 communicates with PC 1410 using an RS232 interface. The software to control the interface between PC 1410 and microprocessor 1784 may be run on PC 1410 in a multi-application environment using a software package such as a program sold under the trade name (WINDOWS) by Microsoft Corporation. The output from DSP 1786 is converted back to an analog signal by digital-to-analog converter 1790. After DSP 1786 modifies the signal from A/D 1780 as commanded by microprocessor 1784, the output of D/A converter 1790 is sent to audio card 1416. Microprocessor 1784 can be one of the widely available microprocessors such as the microprocessors available from Intel Corporation, and DSP 1786 can be one of the widely available digital signal processing chips available from companies such as Texas Instruments' TMS320CXX series of devices.

It is possible to position bio-monitor 1430 and preprocessor 1432 on a single card that is inserted into an empty card slot in PC 1410. It is also possible to perform the functions of microprocessor 1784 and digital signal processor 1786 using PC 1410 rather than specialized hardware.

Microprocessor 1784 monitors the bio-signal from A/D 1782 to determine what action should be taken by DSP 1786. When the signal from A/D 1782 indicates that user is in a more excited state, microprocessor 1784 indicates to DSP 1786 that it should process the signal from A/D 1780 so that the pitch of the speech signal is decreased. When the bio-signal from A/ID 1782 indicates that the user is in a less excited or fatigued state, microprocessor 1784 instructs DSP 1786 to increase the pitch of the speech signal.

DSP 1786 modifies the pitch of the speech signal by creating a speech model. The DSP then uses the model to recreate the speech signal with a modified pitch. The speech model is created using one of the linear predictive coding techniques which are well-known in the art. One such technique is disclosed in an Analog Device, Inc. application book entitled "Digital Signal Processing Applications Using the ADSP 2100 Family", pp. 355–372, published by Prentice-Hall, Englewood Cliffs, N.J., 1992. This technique involves modeling the speech signal as a FIR (finite impulse response) filter with time varying coefficients, where the filter is excited by a train of impulses. The time T between the impulses is a measure of pitch or fundamental frequency. The time varying coefficients may be calculated using a technique such as the Levinson-Durbin recursion which is disclosed in the above-mentioned Analog Device, Inc. publication. A time T between the impulses composing the train of impulses which excite the filter may be calculated using an algorithm such as John D. Markel's SIFT (simplified inverse filter tracking) algorithm which is disclosed in "The SIFT Algorithm for Fundamental Frequency Estimation" by John D. Markel, IEEE Transactions on Audio and Electroacoustics, Vol. AU-20, No. 5, December, 1972. DSP 1786 modifies the pitch or fundamental frequency of the speech signal by changing the time T between impulses when it excites the FIR filter to recreate the speech signal. For example, the pitch may be increased by 1% by decreasing the time T between impulses by 1%.

It should be noted that the speech signal can be modified in ways other than changes in pitch. For example, pitch, amplitude, frequency and/or signal spectrum may be modified. A portion of the signal spectrum or the entire spectrum may be attenuated or amplified.

It is also possible to monitor bio-signals other than a signal indicative of the impedance between two points on a user's skin. Signals indicative of autonomic activity may be used as bio-signals. Signals indicative of autonomic activity such as blood pressure, pulse rate, brain wave or other electrical activity, pupil size, skin temperature, transparency or reflectivity to a particular electromagnetic wavelength or other signals indicative of the user's emotional state may be used.

Figure 18:
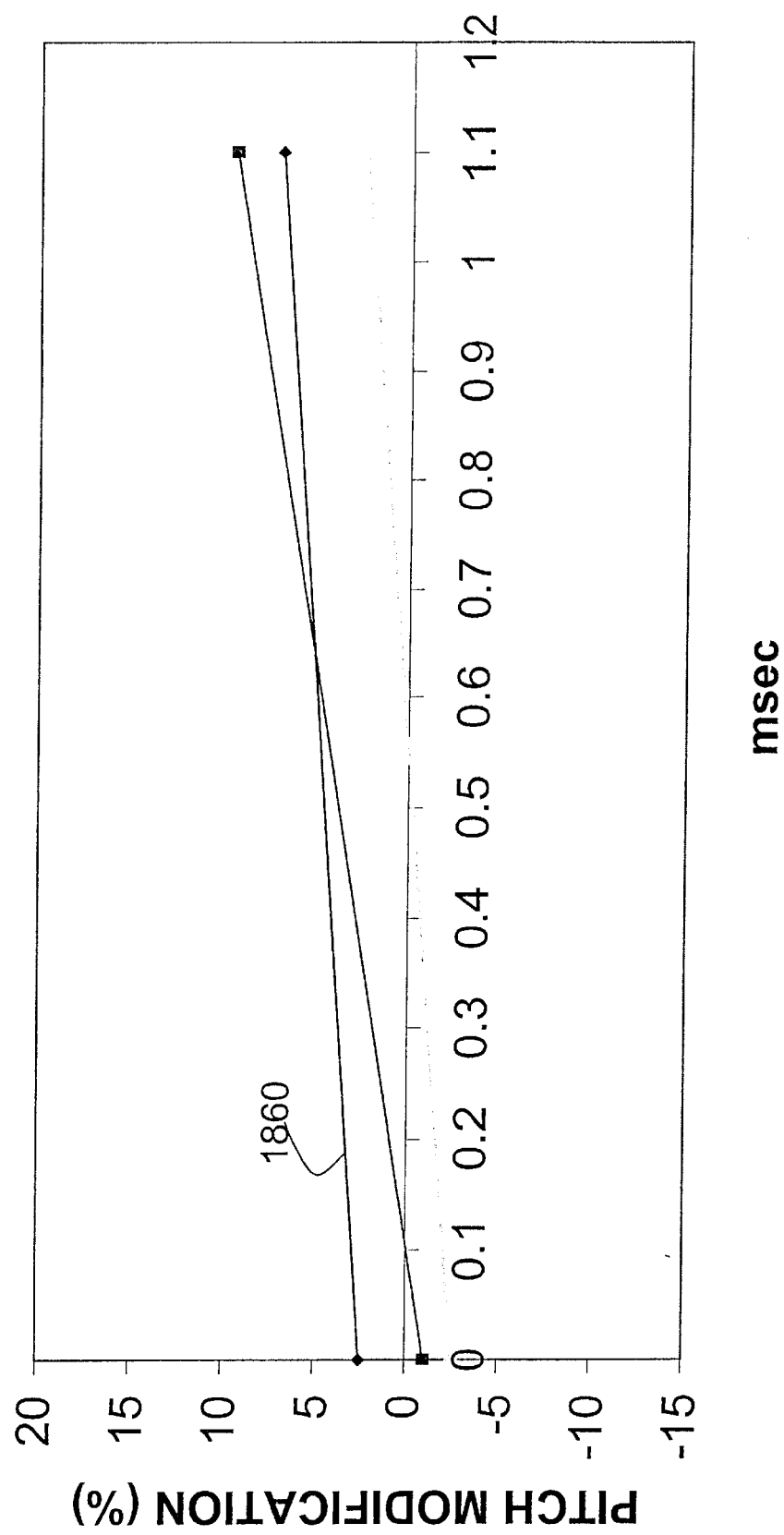
FIG. 18 illustrates a relationship between pitch modification and the bio-signal.

FIG. 18 illustrates pitch modification curves that microprocessor 1784 uses to instruct DSP 1786 to change the pitch of the speech signal based on the time period T associated with the bio-signal. Horizontal axis 1802 indicates time period T between ramps 1442 of the bio-signal and vertical axis 1804 indicates the percentage change in pitch that is introduced by DSP 1786.

Figure 19:
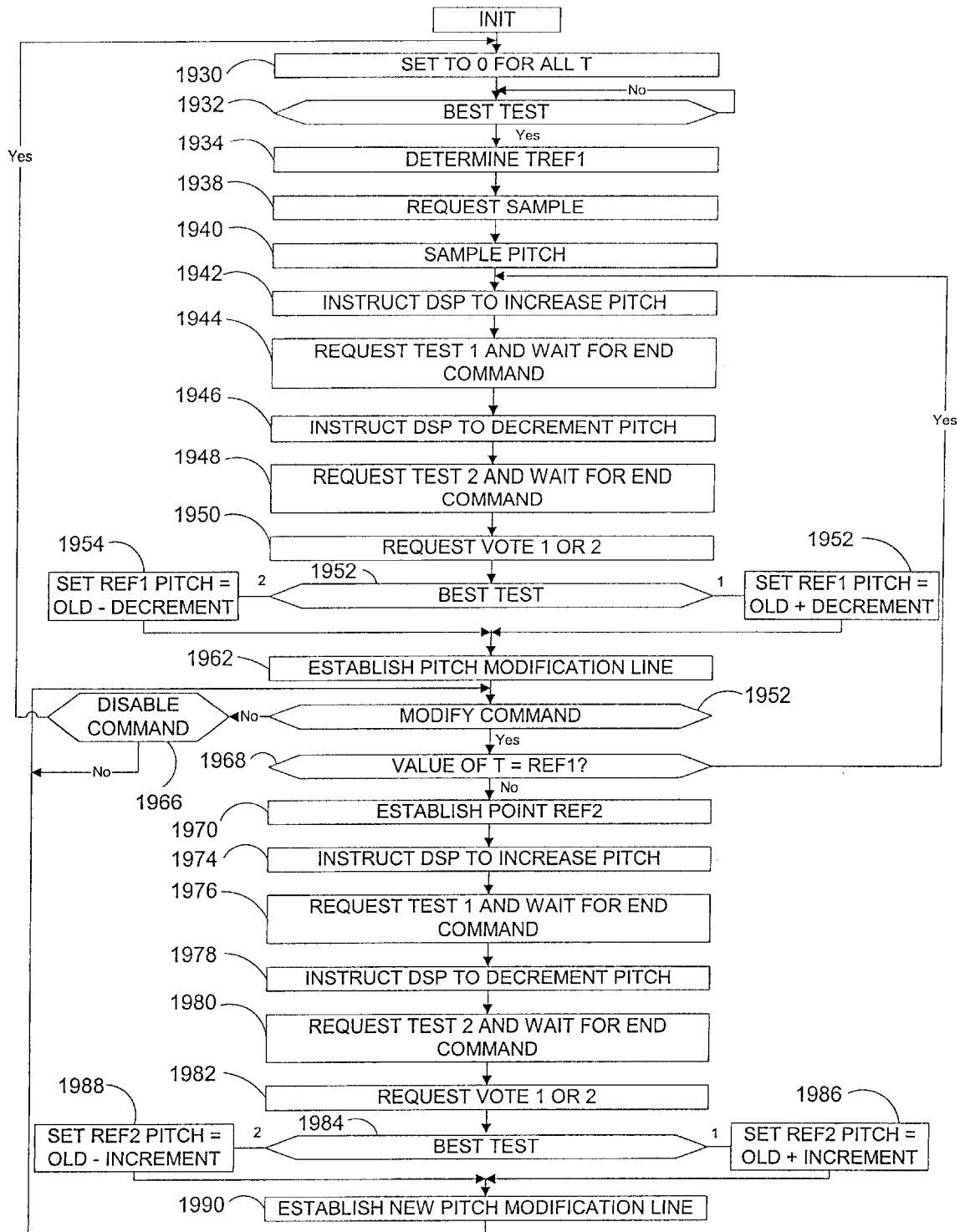
FIG. 19 is a flow chart of a calibration program.

FIG. 19 illustrates a flow chart of the commands executed by microprocessor 1784 to establish an operating curve illustrated in FIG. 18. After initialization, step 1930 is executed to establish a line that is co-linear with axis 1802. This line indicates that zero pitch change is introduced for all values of T from the bio-signal. After step 1930, decision step 1932 is executed where microprocessor 1784 determines whether a modify command has been received from keyboard 1414 or keypad 1439. If no modify command has been received, microprocessor 1784 waits in a loop for a modify command. If a modify command is received, step 1934 is executed to determine the value of T=$T_{ref1}$ that will be used to establish a new reference point Ref1. The value $T_{ref1}$ is equal to the present value of T obtained from the bio-signal. For example, $T_{ref1}$ may equal 0.6 m sec. After determining the value $T_{ref1}$, microprocessor 1784 executes step 1938 which requests the user to state an utterance so that a pitch sample can be taken in step 1940. It is desirable to obtain a pitch sample because that pitch sample is used as a basis for the percentage changes in pitch indicated along axis 1804. In step 1942, microprocessor 1784 instructs DSP 1786 to increase the pitch of the speech signal by an amount equal to the present pitch change associated with point Ref1, plus an increment of five percent; however, smaller or larger increments may be used. (At this point, the pitch change associated with point Ref1 is zero. Recall step 1930). In step 1944, microprocessor 1784 requests the user to run a recognition test by speaking several commands to the speech recognition system to determine if an acceptable recognition rate has been achieved. When the user completes the test, the user can indicate completion of the test to microprocessor 1784 by entering a command such as "end", using keyboard 1414 or keypad 1439.

After executing step 1944, microprocessor 1784 executes step 1946 in which it instructs DSP 1786 to decrease the pitch of the incoming speech signal by the pitch change associated with point Ref1, minus a decrement of five percent; however, smaller or larger amounts may be used. (Note that the pitch change associated with point Ref1 is zero as a result of step 1930). In step 1948, microprocessor 1784 requests that the user perform another speech recognition test and enter an "end" command when the test is completed. In step 1950 microprocessor 1784 requests that the user vote for the first or second test to indicate which test had superior recognition capability. In step 1952 the results of the user's vote is used to select between steps 1954 and 1956. If test 1 was voted as best, step 1956 is executed and the new percentage change associated with point Ref1 is set equal to the prior value of point Ref1 plus five percent or the increment that was used in step 1942. If test 2 is voted best, step 1954 is executed and the new percentage change value associated with Ref1 is set equal to the old value of Ref1 minus five percent or the decrement that was used in step 1946. Determining a percentage change associated with T=$T_{ref1}$ establishes a new reference point Ref1. For example, if test 1 was voted best, point Ref1 is located at point 1858 in FIG. 18. After establishing the position of point 1858 which is the newly-established Ref1, line 1860 is established in step 1962. Line 1860 is the initial pitch modification line that is used to calculate pitch changes for different values of T from the bio-signal. Initially, this line may be given a slope such as plus five percent per millisecond; however, other slopes may be used.

After establishing this initial modification line, microprocessor 1784 goes into a wait loop where steps 1964 and 1966 are executed. In step 1964, microprocessor 1784 checks for a modify command, and in step 1966, it checks for a disable command. If a modify command is not received in step 1964, the processor checks for the disable command in step 1966. If a disable command is not received, microprocessor returns to step 1964, and if a disable command is received, the microprocessor executes step 1930 which sets the change in pitch equal to zero for all values of T from the bio-signal. The processor stays in this loop of checking for modify and disable commands until the user becomes dissatisfied with the recognition rate resulting from the preprocessing of the speech signal using curve 1860.

If in step 1964 a modify command is received, step 1968 is executed. In step 1968, the value of T is determined to check if the value of T is equal to, or nearly equal to the value $T_{ref1}$ of point Ref1. If the value of T corresponds to Ref1, step 1942 is executed. If the value of T does not correspond to Ref1, step 1970 is executed. In step 1970, the value of $T_{ref2}$ for a new reference point Ref2 is established. For the purposes of an illustrative example, we will assume that $T_{ref2}$=1.1 m sec. In reference to FIG. 18, this establishes point Ref2 as point 1872 on line 1860. In step 1974, microprocessor 1784 instructs the DSP 1786 to increase the pitch change associated with point Ref2 by plus 2.5 percent (other values of percentage may be used). (Other values of percentage may be used) In step 1976, the user is requested to perform a recognition test and to enter the "end" command when completed. In step 1978, microprocessor 1784 instructs DSP 1786 to decrease the pitch of the speech signal by an amount equal to the pitch change associated with Ref2 minus 2.5 percent. In step 1980, the user is again requested to perform a recognition test and to enter an "end" command when completed. In step 1982 the user is requested to indicate whether the first or second test had the most desirable results. In step 1984, microprocessor 1784 decides to execute step 1986 if test 1 was voted best, and step 1988, if test 2 was voted best. In step 1986, microprocessor 1784 sets the percentage change associated with point Ref2 to the prior value associated with Ref2 plus 2.5 percent or the increment that was used in step 1974. In step 1988, the percentage change associated with Ref2 is set equal to the prior value associated with Ref2 minus 2.5 percent or the decrement that was used in step 1978. After completing steps 1986 or 1988, step 1990 is executed. In step 1990, a new pitch modification line is established. The new line uses the point associated with Ref1 and the new point associated with Ref2. For example, if it is assumed that the user selected test 1 in step 1984, the new point associated with Ref2 is point 1892 of FIG. 18. The new pitch conversion line is now line 1898 which passes through points 1892 and 1858. After executing step 1990 microprocessor 1684 returns to the looping operation associated with steps 1964 and 1966.

It should be noted that a linear modification line has been used; however, it is possible to use non-linear modification lines. This can be done by using points 1858 and 196 to establish a slope for a line to the right of point 1858, and by using another reference point to the left of point 1858 to establish a slope for a line extending to the left of point 1858. It is also possible to place positive and negative limits on the maximum percentage pitch change. When the pitch modification line approaches these limits, they can approach it asymptotically, or simply change abruptly at the point of contact with the limit.

Figure 20:
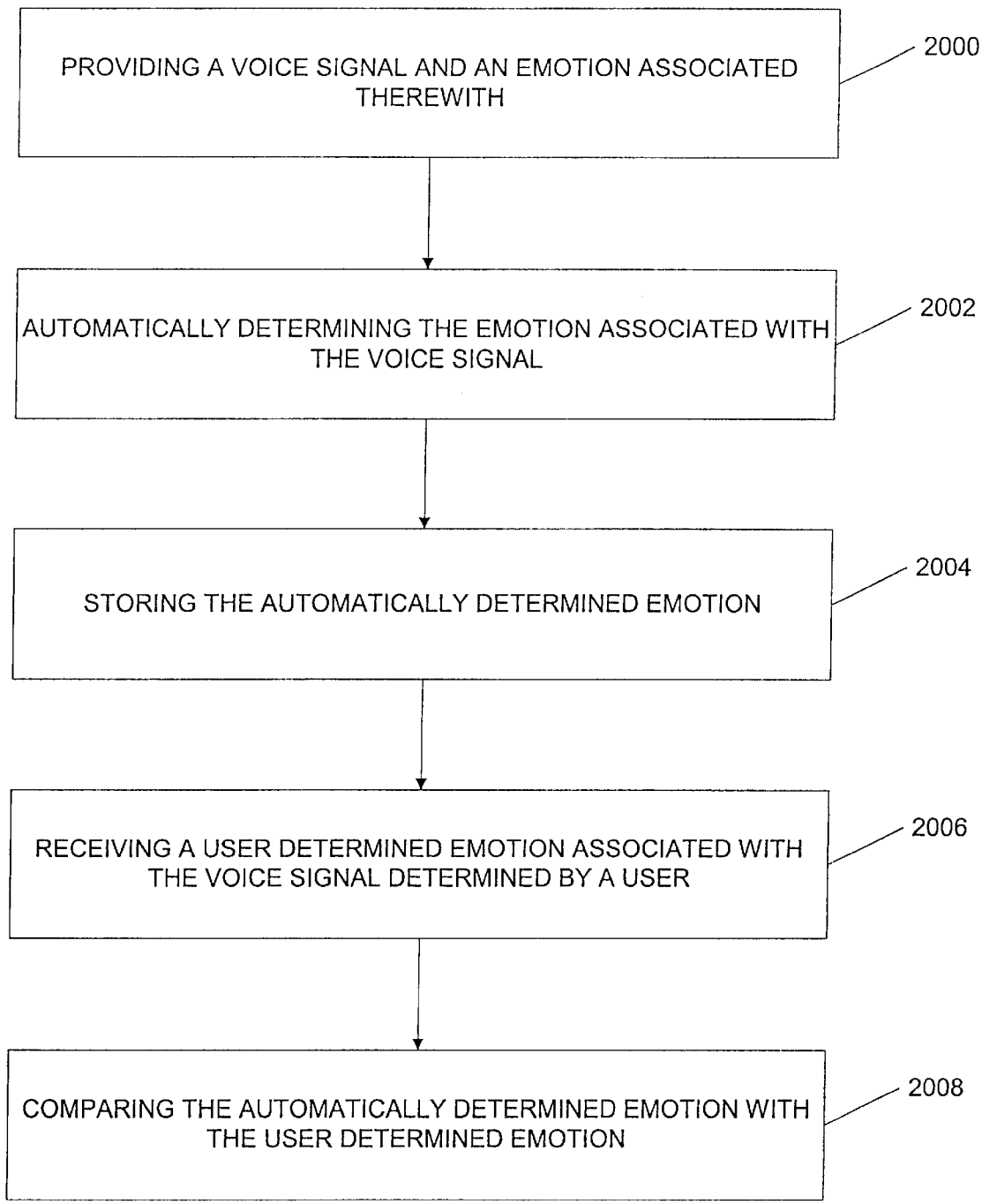
FIG. 20 shows generally the configuration of the portion of the system of the present invention wherein improved selection of a set of pitch period candidates is achieved.

It is also possible to use a fixed modification curve, such as curve 1800, and then adjust variable resistor 1666 until an acceptable recognition rate is achieved Voice Messaging System FIG. 20 depicts an embodiment of the present invention that manages voice messages based on emotion characteristics of the voice messages. In operation 2000, a plurality of voice messages that are transferred over a telecommunication network are received. In operation 2002, the voice messages are stored on a storage medium such as the tape recorder set forth above or a hard drive, for example. An emotion associated with voice signals of the voice messages is determined in operation 2004. The emotion may be determined by any of the methods set forth above.

The voice messages are organized in operation 2006 based on the determined emotion. For example, messages in which the voice displays negative emotions, e.g., sadness, anger or fear, can be grouped together in a mailbox and/or database. Access to the organized voice messages is allowed in operation 2008.

The voice messages may follow a telephone call. Optionally, the voice messages of a similar emotion can be organized together. Also optionally, the voice messages may be organized in real time immediately upon receipt over the telecommunication network. Preferably, a manner in which the voice messages are organized is identified to facilitate access to the organized voice messages. Also preferably, the emotion is determined by extracting at least one feature from the voice signals, as previously discussed.

In one exemplary embodiment of a voice messaging system in accordance with the present invention, pitch and LPC parameters (and usually other excitation information too) are encoded for transmission and/or storage, and are decoded to provide a close replication of the original speech input.

The present invention is particularly related to linear predictive coding (LPC) systems for (and methods of) analyzing or encoding human speech signals. In LPC modeling generally, each sample in a series of samples is modeled (in the simplified model) as a linear combination of preceding samples, plus an excitation function:

$$S_k = \sum_{j=1}^{N} a_j S_{k-j} + u_k$$

where $u_k$ is the LPC residual signal. That is, $u_k$ represents the residual information in the input speech signal which is not predicted by the LPC model. Note that only N prior signals are used for prediction. The model order (typically around 10) can be increased to give better prediction, but some information will always remain in the residual signal $u_k$ for any normal speech modeling application.

Within the general framework of LPC modeling, many particular implementations of voice analysis can be selected. In many of these, it is necessary to determine the pitch of the input speech signal. That is, in addition to the formant frequencies, which in effect correspond to resonances of the vocal tract, the human voice also contains a pitch, modulated by the speaker, which corresponds to the frequency at which the larynx modulates the air stream. That is, the human voice can be considered as an excitation function applied to an acoustic passive filter, and the excitation function will generally appear in the LPC residual function, while the characteristics of the passive acoustic filter (i.e., the resonance characteristics of mouth, nasal cavity, chest, etc.) will be molded by the LPC parameters. It should be noted that during unvoiced speech, the excitation function does not have a well-defined pitch, but instead is best modeled as broad band white noise or pink noise.

Estimation of the pitch period is not completely trivial. Among the problems is the fact that the first formant will often occur at a frequency close to that of the pitch. For this reason, pitch estimation is often performed on the LPC residual signal, since the LPC estimation process m effect deconvolves vocal tract resonances from the excitation information, so that the residual signal contains relatively less of the vocal tract resonances (formants) and relatively more of the excitation information (pitch). However, such residual-based pitch estimation techniques have their own difficulties. The LPC model itself will normally introduce high frequency noise into the residual signal, and portions of this high frequency noise may have a higher spectral density than the actual pitch which should be detected. One solution to this difficulty is simply to low pass filter the residual signal at around 1000 Hz. This removes the high frequency noise, but also removes the legitimate high frequency energy which is present in the unvoiced regions of speech, and renders the residual signal virtually useless for voicing decisions.

A cardinal criterion in voice messaging applications is the quality of speech reproduced. Prior art systems have had many difficulties in this respect. In particular, many of these difficulties relate to problems of accurately detecting the pitch and voicing of the input speech signal.

It is typically very easy to incorrectly estimate a pitch period at twice or half its value. For example, if correlation methods are used, a good correlation at a period P guarantees a good correlation at period 2P, and also means that the signal is more likely to show a good correlation at period P/2. However, such doubling and halving errors produce very annoying degradation in voice quality. For example, erroneous halving of the pitch period will tend to produce a squeaky voice, and erroneous doubling of the pitch period will tend to produce a coarse voice. Moreover, pitch period doubling or halving is very likely to occur intermittently, so that the synthesized voice will tend to crack or to grate, intermittently.

The present invention uses an adaptive filter to filter the residual signal. By using a time-varying filter which has a single pole at the first reflection coefficient ($k_1$ of the speech input), the high frequency noise is removed from the voiced periods of speech, but the high frequency information in the unvoiced speech periods is retained. The adaptively filtered residual signal is then used as the input for the pitch decision.

It is necessary to retain the high frequency information in the unvoiced speech periods to permit better voicing/ unvoicing decisions. That is, the "unvoiced" voicing decision is normally made when no strong pitch is found, that is when no correlation lag of the residual signal provides a high normalized correlation value. However, if only a low-pass filtered portion of the residual signal during unvoiced speech periods is tested, this partial segment of the residual signal may have spurious correlations. That is, the danger is that the truncated residual signal which is produced by the fixed low-pass filter of the prior art does not contain enough data to reliably show that no correlation exists during unvoiced periods, and the additional band width provided by the high-frequency energy of unvoiced periods is necessary to reliably exclude the spurious correlation lags which might otherwise be found.

Improvement in pitch and voicing decisions is particularly critical for voice messaging systems, but is also desirable for other applications. For example, a word recognizer which incorporated pitch information would naturally require a good pitch estimation procedure. Similarly, pitch information is sometimes used for speaker verification, particularly over a phone line, where the high frequency information is partially lost. Moreover, for long-range future recognition systems, it would be desirable to be able to take account of the syntactic information which is denoted by pitch. Similarly, a good analysis of voicing would be desirable for some advanced speech recognition systems, e.g., speech to text systems.

The first reflection coefficient $k_1$ is approximately related to the high/low frequency energy ratio and a signal. See R. J. McAulay, "Design of a Robust Maximum Likelihood Pitch Estimator for Speech and Additive Noise," Technical Note, 1979—28, Lincoln Labs, Jun. 11, 1979, which is hereby incorporated by reference. For $k_1$ close to −1, there is more low frequency energy in the signal than high-frequency energy, and vice versa for $k_1$ close to 1. Thus, by using $k_1$ to determine the pole of a 1-pole deemphasis filter, the residual signal is low pass filtered in the voiced speech periods and is high pass filtered in the unvoiced speech periods. This means that the formant frequencies are excluded from computation of pitch during the voiced periods, while the necessary high-band width information is retained in the unvoiced periods for accurate detection of the fact that no pitch correlation exists.

Preferably a post-processing dynamic programming technique is used to provide not only an optimal pitch value but also an optimal voicing decision. That is, both pitch and voicing are tracked from frame to frame, and a cumulative penalty for a sequence of frame pitch/voicing decisions is accumulated for various tracks to find the track which gives optimal pitch and voicing decisions. The cumulative penalty is obtained by imposing a frame error is going from one frame to the next. The frame error preferably not only penalizes large deviations in pitch period from frame to frame, but also penalizes pitch hypotheses which have a relatively poor correlation "goodness" value, and also penalizes changes in the voicing decision if the spectrum is relatively unchanged from frame to frame. This last feature of the frame transition error therefore forces voicing transitions towards the points of maximal spectral change.

The voice messaging system of the present invention includes a speech input signal, which is shown as a time series si, is provided to an LPC analysis block. The LPC analysis can be done by a wide variety of conventional techniques, but the end product is a set of LPC parameters and a residual signal $u_i$. Background on LPC analysis generally, and on various methods for extraction of LPC parameters, is found in numerous generally known references, including Markel and Gray, Linear Prediction of Speech (1976) and Rabiner and Schafer, Digital Processing of Speech Signals (1978), and references cited therein, all of which are hereby incorporated by reference.

In the presently preferred embodiment, the analog speech waveform is sampled at a frequency of 8 KHz and with a precision of 16 bits to produce the input time series $S_i$. Of course, the present invention is not dependent at all on the sampling rate or the precision used, and is applicable to speech sampled at any rate, or with any degree of precision, whatsoever.

In the presently preferred embodiment, the set of LPC parameters which is used includes a plurality of reflection coefficients $k_i$, and a 10th-order LPC model is used (that is, only the reflection coefficients $k_1$ through $k_{10}$ are extracted, and higher order coefficients are not extracted). However, other model orders or other equivalent sets of LPC parameters can be used, as is well known to those skilled in the art. For example, the LPC predictor coefficients $a_k$ can be used, or the impulse response estimates $e_k$. However, the reflection coefficients $k_i$ are most convenient.

In the presently preferred embodiment, the reflection coefficients are extracted according to the Leroux-Gueguen procedure, which is set forth, for example, in IEEE Transactions on Acoustics, Speech and Signal Processing, p. 257 (June 1977), which is hereby incorporated by reference. However, other algorithms well known to those skilled in the art, such as Durbin's, could be used to compute the coefficients.

A by-product of the computation of the LPC parameters will typically be a residual signal $u_k$. However, if the parameters are computed by a method which does not automatically pop out the $u_k$ as a by-product, the residual can be found simply by using the LPC parameters to configure a finite-impulse-response digital filter which directly computes the residual series $u_k$ from the input series $s_k$.

The residual signal time series $u_k$ is now put through a very simple digital filtering operation, which is dependent on the LPC parameters for the current frame. That is, the speech input signal $s_k$ is a time series having a value which can change once every sample, at a sampling rate of, e.g., 8 KHz. However, the LPC parameters are normally recomputed only once each frame period, at a frame frequency of e.g., 100 Hz. The residual signal $u_k$ also has a period equal to the sampling period. Thus, the digital filter, whose value is dependent on the LPC parameters, is preferably not readjusted at every residual signal $u_k$. In the presently preferred embodiment, approximately 80 values in the residual signal time series $u_k$ pass through the filter 14 before a new value of the LPC parameters is generated, and therefore a new characteristic for the filter 14 is implemented.

More specifically, the first reflection coefficient $k_1$ is extracted from the set of LPC parameters provided by the LPC analysis section 12. Where the LPC parameters themselves are the reflection coefficients $k_I$, it is merely necessary to look up the first reflection coefficient $k_1$. However, where other LPC parameters are used, the transformation of the parameters to produce the first order reflection coefficient is typically extremely simple, for example, $k_1 = a_1/a_0$ Although the present invention preferably uses the first reflection coefficient to define a 1-pole adaptive filter, the invention is not as narrow as the scope of this principal preferred embodiment. That is, the filter need not be a single-pole filter, but may be configured as a more complex filter, having one or more poles and or one or more zeros, some or all of which may be adaptively varied according to the present invention.

It should also be noted that the adaptive filter characteristic need not be determined by the first reflection coefficient $k_1$. As is well known in the art, there are numerous equivalent sets of LPC parameters, and the parameters in other LPC parameter sets may also provide desirable filtering characteristics. Particularly, in any set of LPC parameters, the lowest order parameters are most likely to provide information about gross spectral shape. Thus, an adaptive filter according to the present invention could use $a_1$ or $e_1$ to define a pole, can be a single or multiple pole and can be used alone or in combination with other zeros and or poles. Moreover, the pole (or zero) which is defined adaptively by an LPC parameter need not exactly coincide with that parameter, as in the presently preferred embodiment, but can be shifted in magnitude or phase.

Thus, the 1-pole adaptive filter filters the residual signal time series $u_k$ to produce a filtered time series $u'_k$. As discussed above, this filtered time series $u'_k$ will have its high frequency energy greatly reduced during the voiced speech segments, but will retain nearly the full frequency band width during the unvoiced speech segments. This filtered residual signal $u'_k$ is then subjected to further processing, to extract the pitch candidates and voicing decision.

A wide variety of methods to extract pitch information from a residual signal exist, and any of them can be used. Many of these are discussed generally in the Market and Gray book incorporated by reference above.

In the presently preferred embodiment, the candidate pitch values are obtained by finding the peaks in the normalized correlation function of the filtered residual signal, defined as follows:

$$C_k = \frac{\sum_{j=0}^{m-1} u_j u_j - k}{\left(\sum_{j=0}^{m-1} u_j^2\right)^{1/2} \left(\sum_{j=0}^{m-1} u_j^2 - k\right)^{1/2}} \text{ for } k_{min} \le k \le k_{max}$$

where $u'_j$ is the filtered residual signal, $k_{min}$ and $k_{max}$ define the boundaries for the correlation lag k, and m is the number of samples in one frame period (80 in the preferred embodiment) and therefore defines the number of samples to be correlated. The candidate pitch values are defined by the lags k* at which value of C(k*) takes a local maximum, and the scalar value of C(k) is used to define a "goodness" value for each candidate k*.

Optionally a threshold value $C_{min}$ will be imposed on the goodness measure C(k), and local maxima of C(k) which do not exceed the threshold value $C_{min}$ will be ignored. If no k* exists for which C(k*) is greater than $C_{min}$, then the frame is necessarily unvoiced.

Alternately, the goodness threshold $C_{min}$ can be dispensed with, and the normalized autocorrelation function 1112 can simply be controlled to report out a given number of candidates which have the best goodness values, e.g., the 16 pitch period candidates k having the largest values of C(k).

In one embodiment, no threshold at all is imposed on the goodness value C(k), and no voicing decision is made at this stage. Instead, the 16 pitch period candidates k*$_1$, k*$_2$, etc., are reported out, together with the corresponding goodness value (C(k*$_i$)) for each one. In the presently preferred embodiment, the voicing decision is not made at this stage, even if all of the C(k) values are extremely low, but the voicing decision will be made in the succeeding dynamic programming step, discussed below.

In the presently preferred embodiment, a variable number of pitch candidates are identified, according to a peak-finding algorithm. That is, the graph of the "goodness" values C(k) versus the candidate pitch period k is tracked. Each local maximum is identified as a possible peak. However, the existence of a peak at this identified local maximum is not confirmed until the function has thereafter dropped by a constant amount. This confirmed local maximum then provides one of the pitch period candidates. After each peak candidate has been identified in this fashion, the algorithm then looks for a valley. That is, each local minimum is identified as a possible valley, but is not confirmed as a valley until the function has thereafter risen by a predetermined constant value. The valleys are not separately reported out, but a confirmed valley is required after a confirmed peak before a new peak will be identified. In the presently preferred embodiment, where the goodness values are defined to be bounded by +1 or −1, the constant value required for confirmation of a peak or for a valley has been set at 0.2, but this can be widely varied. Thus, this stage provides a variable number of pitch candidates as output, from zero up to 15.

In the presently preferred embodiment, the set of pitch period candidates provided by the foregoing steps is then provided to a dynamic programming algorithm. This dynamic programming algorithm tracks both pitch and voicing decisions, to provide a pitch and voicing decision for each frame which is optimal in the context of its neighbors.

Given the candidate pitch values and their goodness values C(k), dynamic programming is now used to obtain an optimum pitch contour which includes an optimum voicing decision for each frame. The dynamic programming requires several frames of speech in a segment of speech to be analyzed before the pitch and voicing for the first frame of the segment can be decided. At each frame of the speech segment, every pitch candidate is compared to the retained pitch candidates from the previous frame. Every retained pitch candidate from the previous frame carries with it a cumulative penalty, and every comparison between each new pitch candidate and any of the retained pitch candidates also has a new distance measure. Thus, for each pitch candidate in the new frame, there is a smallest penalty which represents a best match with one of the retained pitch candidates of the previous frame. When the smallest cumulative penalty has been calculated for each new candidate, the candidate is retained along with its cumulative penalty and a back pointer to the best match in the previous frame. Thus, the back pointers define a trajectory which has a cumulative penalty as listed in the cumulative penalty value of the last frame in the project rate. The optimum trajectory for any given frame is obtained by choosing the trajectory with the minimum cumulative penalty. The unvoiced state is defined as a pitch candidate at each frame. The penalty function preferably includes voicing information, so that the voicing decision is a natural outcome of the dynamic programming strategy.

In the presently preferred embodiment, the dynamic programming strategy is 16 wide and 6 deep. That is, 15 candidates (or fewer) plus the "unvoiced" decision (stated for convenience as a zero pitch period) are identified as possible pitch periods at each frame, and all 16 candidates, together with their goodness values, are retained for the 6 previous frames.

The decisions as to pitch and voicing are made final only with respect to the oldest frame contained in the dynamic programming algorithm. That is, the pitch and voicing decision would accept the candidate pitch at frame $F_K$−5 whose current trajectory cost was minima. That is, of the 16 (or fewer) trajectories ending at most recent frame $F_K$, the candidate pitch in frame $F_K$ which has the lowest cumulative trajectory cost identifies the optimal trajectory. This optimal trajectory is then followed back and used to make the pitch/voicing decision for frame $F_K$−5. Note that no final decision is made as to pitch candidates in succeeding frames ($F_K$−4, etc.), since the optimal trajectory may no longer appear optimal after more frames are evaluated. Of course, as is well known to those skilled in the art of numerical optimization, a final decision in such a dynamic programming algorithm can alternatively be made at other times, e.g., in the next to last frame held in the buffer. In addition, the width and depth of the buffer can be widely varied. For example, as many as 64 pitch candidates could be evaluated, or as few as two; the buffer could retain as few as one previous frame, or as many as 16 previous frames or more, and other modifications and variations can be instituted as will be recognized by those skilled in the art. The dynamic programming algorithm is defined by the transition error between a pitch period candidate in one frame and another pitch period candidate in the succeeding frame. In the presently preferred embodiment, this transition error is defined as the sum of three parts: an error $E_p$ due to pitch deviations, an error $E_s$ due to pitch candidates having a low "goodness" value, and an error $E_t$ due to the voicing transition.

The pitch deviation error $E_p$ is a function of the current pitch period and the previous pitch period as given by:

$$E_p = \min \begin{Bmatrix} A_D + B_p \left| \ln \dfrac{tau}{tau_p} \right| \\ A_D + B_p \left| \ln \dfrac{tau}{tau_p} \right| + Bp \ln 2 \\ A_D + B_p \left( \left| \ln \dfrac{tau}{tau_p} \right| + \ln(1/2) \right) \end{Bmatrix}$$

if both frames are voiced, and $E_P$=$B_P$.times.$D_N$ otherwise; where tau is the candidate pitch period of the current frame, $tau_P$ is a retained pitch period of the previous frame with respect to which the transition error is being computed, and $B_P$, $A_D$, and $D_N$ are constants. Note that the minimum function includes provision for pitch period doubling and pitch period halving. This provision is not strictly necessary in the present invention, but is believed to be advantageous. Of course, optionally, similar provision could be included for pitch period tripling, etc.

The voicing state error, $E_S$, is a function of the "goodness" value C(k) of the current frame pitch candidate being considered. For the unvoiced candidate, which is always included among the 16 or fewer pitch period candidates to be considered for each frame, the goodness value C(k) is set equal to the maximum of C(k) for all of the other 15 pitch period candidates in the same frame. The voicing state error $E_S$ is given by $E_S$=$B_S$ ($R_V$–C(tau)), if the current candidate is voiced, and $E_S$=$B_S$ (C(tau)-$R_U$) otherwise, where C(tau) is the "goodness value" corresponding to the current pitch candidate tau, and $B_S$, $R_V$, and $R_U$ are constants.

The voicing transition error $E_T$ is defined in terms of a spectral difference measure T. The spectral difference measure T defined, for each frame, generally how different its spectrum is from the spectrum of the receiving frame. Obviously, a number of definitions could be used for such a spectral difference measure, which in the presently preferred embodiment is defined as follows:

$$T = \left( \log \left( \dfrac{E}{E_p} \right) \right)^2 + \sum_N (L(N) - L_p(N))^2$$

where E is the RMS energy of the current frame, $E_P$ is the energy of the previous frame, L(N) is the Nth log area ratio of the current frame and $L_P$ (N) is the Nth log area ratio of the previous frame. The log area ratio L(N) is calculated directly from the Nth reflection coefficient $k_N$ as follows:

$$L(N) = \ln \left( \dfrac{1-k_N}{1+k_N} \right)$$

The voicing transition error $E_T$ is then defined, as a function of the spectral difference measure T, as follows:
If the current and previous frames are both unvoiced, or if both are voiced, $E_T$ is set=to 0;
otherwise, $E_T$=$G_T$+$A_T$/T, where T is the spectral difference measure of the current frame. Again, the definition of the voicing transition error could be widely varied. The key feature of the voicing transition error as defined here is that, whenever a voicing state change occurs (voiced to unvoiced or unvoiced to voiced) a penalty is assessed which is a decreasing function of the spectral difference between the two frames. That is, a change in the voicing state is disfavored unless a significant spectral change also occurs.

Such a definition of a voicing transition error provides significant advantages in the present invention, since it reduces the processing time required to provide excellent voicing state decisions.

The other errors $E_S$ and $E_P$ which make up the transition error in the presently preferred embodiment can also be variously defined. That is, the voicing state error can be defined in any fashion which generally favors pitch period hypotheses which appear to fit the data in the current frame well over those which fit the data less well. Similarly, the pitch deviation error Ep can be defined in any fashion which corresponds generally to changes in the pitch period. It is not necessary for the pitch deviation error to include provision for doubling and halving, as stated here, although such provision is desirable.

A further optional feature of the invention is that, when the pitch deviation error contains provisions to track pitch across doublings and halvings, it may be desirable to double (or halve) the pitch period values along the optimal trajectory, after the optimal trajectory has been identified, to make them consistent as far as possible.

It should also be noted that it is not necessary to use all of the three identified components of the transition error. For example, the voicing state error could be omitted, if some previous stage screened out pitch hypotheses with a low "goodness" value, or if the pitch periods were rank ordered by "goodness" value in some fashion such that the pitch periods having a higher goodness value would be preferred, or by other means. Similarly, other components can be included in the transition error definition as desired.

It should also be noted that the dynamic programming method taught by the present invention does not necessarily have to be applied to pitch period candidates extracted from an adaptively filtered residual signal, nor even to pitch period candidates which have been derived from the LPC residual signal at all, but can be applied to any set of pitch period candidates, including pitch period candidates extracted directly from the original input speech signal.

These three errors are then summed to provide the total error between some one pitch candidate in the current frame and some one pitch candidate in the preceding frame. As noted above, these transition errors are then summed cumulatively, to provide cumulative penalties for each trajectory in the dynamic programming algorithm.

This dynamic programming method for simultaneously finding both pitch and voicing is itself novel, and need not be used only in combination with the presently preferred method of finding pitch period candidates. Any method of finding pitch period candidates can be used in combination with this novel dynamic programming algorithm. Whatever the method used to find pitch period candidates, the candidates are simply provided as input to the dynamic programming algorithm.

In particular, while the embodiment of the present invention using a minicomputer and high-precision sampling is presently preferred, this system is not economical for large-volume applications. Thus, the preferred mode of practicing the invention in the future is expected to be an embodiment using a microcomputer based system, such as the TI Professional Computer. This professional computer, when configured with a microphone, loudspeaker, and speech processing board including a TMS 320 numerical processing microprocessor and data converters, is sufficient hardware to practice the present invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for comparing user versus computer emotion detection of voice signals comprising the steps of:
   (a) providing a voice signal and an emotion associated therewith to a workstation and a user;
   (b) automatically determining the emotion associated with the voice signal using the workstation;
   (c) storing the automatically determined emotion of the workstation;
   (d) receiving a user determined emotion associated with the voice signal; and
   (e) comparing the automatically determined emotion with the user determined emotion.

2. A method as recited in claim 1, wherein the voice signal is emitted by a person exhibiting a predetermined emotion.

3. A method as recited in claim 1, wherein the voice signal is received by the workstation from a stored file, wherein the workstation is operable to replay the voice signal to the user.

4. A method as recited in claim 1, wherein the emotion associated with the voice signal is identified upon the emotion being provided, and further comprising the step of determining whether the automatically determined emotion or the user determined emotion matches the identified emotion.

5. A method as recited in claim 4, and further comprising the step of awarding the user a prize upon user determined emotion matching the identified emotion.

6. A method as recited in claim 1, wherein the emotion is automatically determined by extracting at least one feature from the voice signals.

7. A computer program embodied on a computer readable medium for comparing user versus computer emotion detection of voice signals comprising:
   (a) a code segment that provides a voice signal and an emotion associated therewith to a workstation and a user;
   (b) a code segment that automatically determines the emotion associated with the voice signal using the workstation;
   (c) a code segment that stores the automatically determined emotion of the workstation;
   (d) a code segment that receives a user determined emotion associated with the voice signal; and
   (e) a code segment that compares the automatically determined emotion with the user determined emotion.

8. A computer program as recited in claim 7, wherein the voice signal is emitted by a person exhibiting a predetermined emotion.

9. A computer program as recited in claim 7, wherein the voice signal is received by the workstation from a stored file, wherein the workstation is operable to replay the voice signal to the user.

10. A computer program as recited in claim 7, wherein the emotion associated with the voice signal is identified upon the emotion being provided, and further comprising a code segment for determining whether the automatically determined emotion or the user determined emotion matches the identified emotion.

11. A computer program as recited in claim 10, and further comprising a code segment that awards the user a prize upon user determined emotion matching the identified emotion.

12. A computer program as recited in claim 7, wherein the emotion is automatically determined by extracting at least one feature from the voice signals.

13. A system for comparing user versus computer emotion detection of voice signals comprising:
   (a) logic that provides a voice signal and an emotion associated therewith to a workstation and a user;
   (b) logic that automatically allows the workstation to determine the emotion associated with the voice signal;
   (c) logic that stores the automatically determined emotion;
   (d) logic that receives a user determined emotion associated with the voice signal; and
   (e) logic that compares the automatically determined emotion with the user determined emotion.

14. A system as recited in claim 13, wherein the voice signal is emitted by a person exhibiting a predetermined emotion.

15. A system as recited in claim 13, wherein the voice signal is received by the workstation from a stored file, wherein the workstation is operable to replay the voice signal to the user.

16. A system as recited in claim 13, wherein the emotion associated with the voice signal is identified upon the emotion being provided, and further comprising logic for determining whether the automatically determined emotion or the user determined emotion matches the identified emotion.

17. A system as recited in claim 16, and further comprising logic that awards the user a prize upon user determined emotion matching the identified emotion.

18. A system as recited in claim 13, wherein the emotion is automatically determined by extracting at least one feature from the voice signals.

* * * * *

UNITED STATES PATENT AND TRADEMARK OFFICE
CERTIFICATE OF CORRECTION

PATENT NO.    : 6,353,810 B1
DATED         : March 5, 2002
INVENTOR(S)   : Valery A. Petrushin It is certified that error appears in the above-identified patent and that said Letters Patent is hereby corrected as shown below:

<u>Title page,</u>
Item [54], please delete the title and insert instead -- EMOTION DETECTION FOR COMPARING USER VERSUS COMPUTER EMOTION DETECTION OF VOICE SIGNALS --.

Signed and Sealed this

Seventeenth Day of June, 2003

JAMES E. ROGAN
*Director of the United States Patent and Trademark Office*